United States Patent
Ichikawa et al.

(10) Patent No.: US 10,031,633 B2
(45) Date of Patent: Jul. 24, 2018

(54) TOUCH PANEL DEVICE AND METHOD FOR CONTROLLING TOUCH PANEL DEVICE

(71) Applicant: FUJITSU COMPONENT LIMITED, Tokyo (JP)

(72) Inventors: Daisuke Ichikawa, Tokyo (JP); Kenichi Fujita, Tokyo (JP); Yuji Makiuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 505 days.

(21) Appl. No.: 14/503,534

(22) Filed: Oct. 1, 2014

(65) Prior Publication Data
US 2015/0138143 A1 May 21, 2015

(30) Foreign Application Priority Data
Nov. 15, 2013 (JP) .................................. 2013-237218

(51) Int. Cl.
*G06F 3/045* (2006.01)
(52) U.S. Cl.
CPC .................................. *G06F 3/045* (2013.01)
(58) Field of Classification Search
CPC ...................................................... G06F 3/045
USPC .................................................. 345/170–178
See application file for complete search history.

(56) References Cited

U.S. PATENT DOCUMENTS

| 5,455,574 A | 10/1995 | Itaya et al. |
| 5,777,604 A * | 7/1998 | Okajima ................. G06F 3/045 178/20.03 |
| 5,854,451 A * | 12/1998 | Miyazaki ................ G06F 3/045 178/18.01 |
| 2009/0096754 A1 | 4/2009 | Hinata |

(Continued)

FOREIGN PATENT DOCUMENTS

| CN | 101408827 A | 4/2009 |
| CN | 102346616 A | 2/2012 |

(Continued)

OTHER PUBLICATIONS

Espacenet English Abstract of Taiwanese Publication No. 201333785, published Aug. 16, 2013.

(Continued)

*Primary Examiner* — Nelson Rosario
*Assistant Examiner* — Andrew Lee
(74) *Attorney, Agent, or Firm* — Staas & Halsey LLP

(57) ABSTRACT

A touch panel device includes: a first resistance film and a second resistance film each of which includes an electrode; a switch connected to the electrode; a controller that controls operation of the switch; and a detector that, when a voltage is applied to a resistance film of a voltage applied side among the first resistance film and the second resistance film, detects presence or absence of touch and a position of the touch based on a voltage detected from the electrode on a resistance film of a voltage detection side among the first resistance film and the second resistance film; wherein before detection operation by the detector, the controller (Continued)

controls the operation of the switch connected to the electrode on the resistance film of the voltage detection side so that the electrode on the resistance film of the voltage detection side is grounded.

6 Claims, 24 Drawing Sheets

(56) References Cited

U.S. PATENT DOCUMENTS

| | | | |
|---|---|---|---|
| 2009/0322701 | A1 | 12/2009 | D'Souza et al. |
| 2011/0043462 | A1* | 2/2011 | Shabra .................... G06F 3/045 345/173 |
| 2011/0148808 | A1 | 6/2011 | Sakurai et al. |
| 2012/0001866 | A1* | 1/2012 | Rapakko ................ G06F 3/045 345/174 |
| 2012/0019477 | A1* | 1/2012 | Fujita ...................... G06F 3/045 345/174 |
| 2012/0139868 | A1 | 6/2012 | Mamba et al. |
| 2012/0262417 | A1* | 10/2012 | Wakasugi ............. G06F 3/0416 345/174 |
| 2013/0141348 | A1 | 6/2013 | Jamshidi-Roudbari et al. |
| 2013/0147734 | A1* | 6/2013 | Yasumoto ............... G06F 3/041 345/173 |
| 2014/0062917 | A1* | 3/2014 | Seo ..................... G06F 3/04883 345/173 |
| 2014/0333583 | A1 | 11/2014 | Fujita |

FOREIGN PATENT DOCUMENTS

| | | |
|---|---|---|
| CN | 102667681 A | 9/2012 |
| JP | 5-241717 | 9/1993 |
| JP | 5-324163 | 12/1993 |
| JP | 6-4832 | 1/1994 |
| JP | 6-161662 | 6/1994 |
| JP | 10-260783 | 9/1998 |
| JP | 11-24843 | 1/1999 |
| JP | 2000-99255 | 4/2000 |
| JP | 2001-60143 | 3/2001 |
| JP | 2008-59037 | 3/2008 |
| TW | 201011623 | 3/2010 |
| TW | 201023019 | 6/2010 |
| TW | 201140417 | 11/2011 |
| TW | 201209668 | 3/2012 |
| TW | 201211865 | 3/2012 |
| TW | 201234250 | 8/2012 |
| TW | 201324298 | 6/2013 |
| TW | 201333785 | 8/2013 |

OTHER PUBLICATIONS

Espacenet English Abstract of Taiwanese Publication No. 201140417, published Nov. 16, 2011.
Espacenet English Abstract of Taiwanese Publication No. 201209668, published Mar. 1, 2012.
Espacenet English Abstract of Taiwanese Publication No. 201011623, published Mar. 16, 2010.
Taiwan Patent Search English Abstract of Taiwanese Publication No. 201211865, published Mar. 16, 2012.
Taiwan Patent Search English Abstract of Taiwanese Publication No. 201234250, published Aug. 16, 2012.
Taiwan Patent Search English Abstract of Taiwanese Publication No. 201023019, published Jun. 16, 2010.
Taiwanese Office Action dated Sep. 25, 2015 in corresponding Taiwanese Patent Application No. 103139285.
Patent Abstracts of Japan, Publication No. 05-241717, published Sep. 21, 1993.
Patent Abstracts of Japan, Publication No. 11-024843, published Jan. 29, 1999.
Patent Abstracts of Japan, Publication No. 2000-099255, published Apr. 7, 2000.
Japanese Office Action dated Jul. 25, 2017 in related Japanese Application No. 2013-237218.
Chinese Office Action dated Mar. 15, 2017 in corresponding Chinese Patent Application No. 201410645739.8.
Japanese Office Action dated Nov. 14, 2017 in the related Japanese Application No. 2013-237218.

* cited by examiner

| SWITCH 31B | ON |
| SWITCH 32B | ON |
| SWITCH 33B | OFF |
| SWITCH 34B | OFF |
| SWITCH 35B | ON |
| SWITCH 36B | OFF |
| SWITCH 37B | ON |

| SWITCH 31B | OFF |
|---|---|
| SWITCH 32B | ON |
| SWITCH 33B | OFF |
| SWITCH 34B | OFF |
| SWITCH 35B | ON |
| SWITCH 36B | OFF |
| SWITCH 37B | ON |

57

| SWITCH 31B | ON |
| --- | --- |
| SWITCH 32B | OFF |
| SWITCH 33B | ON |
| SWITCH 34B | ON |
| SWITCH 35B | ON |
| SWITCH 36B | OFF |
| SWITCH 37B | ON |

TOUCH PANEL DEVICE AND METHOD FOR CONTROLLING TOUCH PANEL DEVICE

CROSS-REFERENCE TO RELATED APPLICATION

This application is based upon and claims the benefit of priority of the prior Japanese Patent Application No. 2013-237218 filed on Nov. 15, 2013, the entire contents of which are incorporated herein by reference.

FIELD

A certain aspect of the embodiments is related to a touch panel device and a method for controlling a touch panel device.

BACKGROUND

Conventionally, there has been known a resistance film type touch panel as one of input means. In the resistance film type touch panel, two resistance films each having electrodes on both ends are opposed to each other via dot spacers. By the pressure of touch, the resistance film of a touch position contacts another resistance film. Thereby, the touch position is detected. Moreover, there has been known a method for detecting an abnormality of the resistance films beforehand by calculating a convergence electric potential (see Japanese Laid-open Patent Publication No. 11-24843).

SUMMARY

According to an aspect of the present invention, there is provided a touch panel device including: a first resistance film and a second resistance film each of which includes an electrode; a switch connected to the electrode; a controller that controls operation of the switch; and a detector that, when a voltage is applied to a resistance film of a voltage applied side among the first resistance film and the second resistance film, detects presence or absence of touch and a position of the touch based on a voltage detected from the electrode on a resistance film of a voltage detection side among the first resistance film and the second resistance film; wherein before detection operation by the detector, the controller controls the operation of the switch connected to the electrode on the resistance film of the voltage detection side so that the electrode on the resistance film of the voltage detection side is grounded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17A is a diagram illustrating a state of a detection voltage at the time of erroneous detection of touch-on;

FIGS. 18A to 18C are diagrams schematically illustrating relationships between a measurement period of coordinates and voltage change by discharge at the time of erroneous detection of touch-on;

DESCRIPTION OF EMBODIMENTS

In the above-mentioned resistance film type touch panel, the resistance film of the surface side bends by aged deterioration or environmental change, and hence an electric capacity between the resistance films increases. Increase of the electric capacity dulls the voltage waveform at the time of coordinate detection. Therefore, when the coordinate detection is performed before a voltage convergence, erroneous detection and coordinate deviation of the touch may occur.

A technology disclosed by Japanese Laid-open Patent Publication No. 11-24843 aims to detect abnormalities in advance and replace the touch panel before malfunction. The touch panel in which the electric capacity has increased cannot be continuously used.

Recently, with thinning and narrowing the touch panel, the touch panel with a large electric capacity (i.e., a high capacity panel) is increasing. Therefore, in the conventional coordinate detection method, malfunction, such as erroneous detection, coordinate deviation of the touch and input impossibility, may occur.

A description will now be given of a preferable embodiment of the present invention with reference to the drawings.

Figure 1:
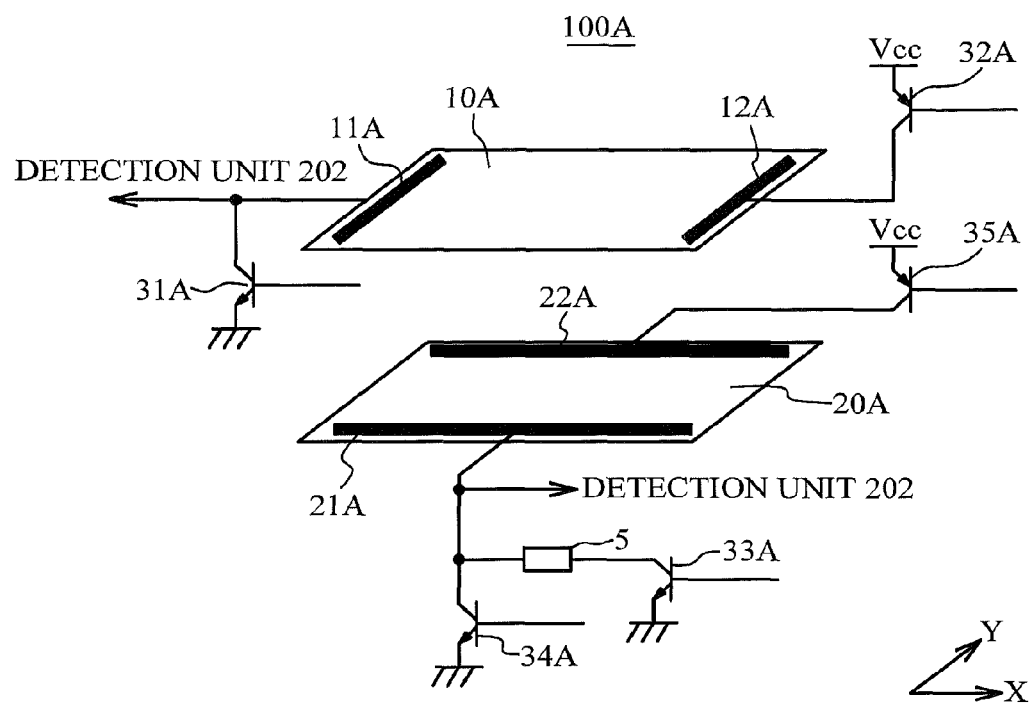
FIG. 1 is a diagram illustrating the configuration of a four-wire type touch panel 100A.

FIG. 1 is a diagram illustrating the configuration of a four-wire type touch panel 100A. The four-wire type touch panel 100A includes: resistance films 10A and 20A which are opposite to each other; electrodes 11A, 12A, 21A and 22A; switches 31A to 35A; and a pull-down resistor 5. In FIG. 1, a direction parallel to the electrode 21A is an X-direction, and a direction parallel to the electrode 11A is a Y-direction. Each of the resistance films 10A and 20A has a rectangular shape. Each of the switches 31A to 35A is a transistor.

The electrodes 11A and 12A are provided on the both ends in the X-direction of the resistance film 10A, respectively. A collector of the switch 31A and a detection unit 202 of a control device 200 described later are connected to the electrode 11A. An emitter of the switch 31A is grounded. A collector of a switch 32A is connected to the electrode 12A, and a power supply voltage Vcc is applied to an emitter of the switch 32A. The electrodes 21A and 22A are provided on the both ends in the Y-direction of the resistance film 20A, respectively. A collector of the switch 35A is connected to the electrode 22A, and the power supply voltage Vcc is applied to an emitter of the switch 35A. The detection unit 202, the pull-down resistor 5 and a collector of the switch 34A are connected to the electrode 21A. The pull-down resistor 5 is connected to a collector of a switch 33A. Emitters of the switches 33A and 34A are grounded.

The electrodes 11A, 12A, 21A and 22A have a function that controls the touch panel 100A by applying the power supply voltage Vcc to the resistance films 10A and 20A, and a function that performs touch detection and coordinate detection by detection of voltages. Here, the touch detection is a process for judging whether the touch panel 100A is operating normally by detecting a voltage when the resistance film 10A is depressed. Hereinafter, that the detection unit judges that the resistance film is touched at the time of the touch detection is called "touch-on", and that the detection unit judges that the resistance film is not touched at the time of the touch detection is called "touch-off". The coordinate detection is a process for detecting a position on the resistance film 10A depressed by the operator. The resistance films 10A and 20A are overlapped so that the electrodes 11A and 12A are opposite to the electrodes 21A and 22A. The resistance films 10A and 20A are separated via dot spacers, not shown, and contact with each other by the pressure of the touch. The touch panel 100A is controlled by the switches 31A to 35A connected to the electrodes 11A, 12A, 21A and 22A, and hence the touch detection and the coordinate detection are performed.

Figure 2:
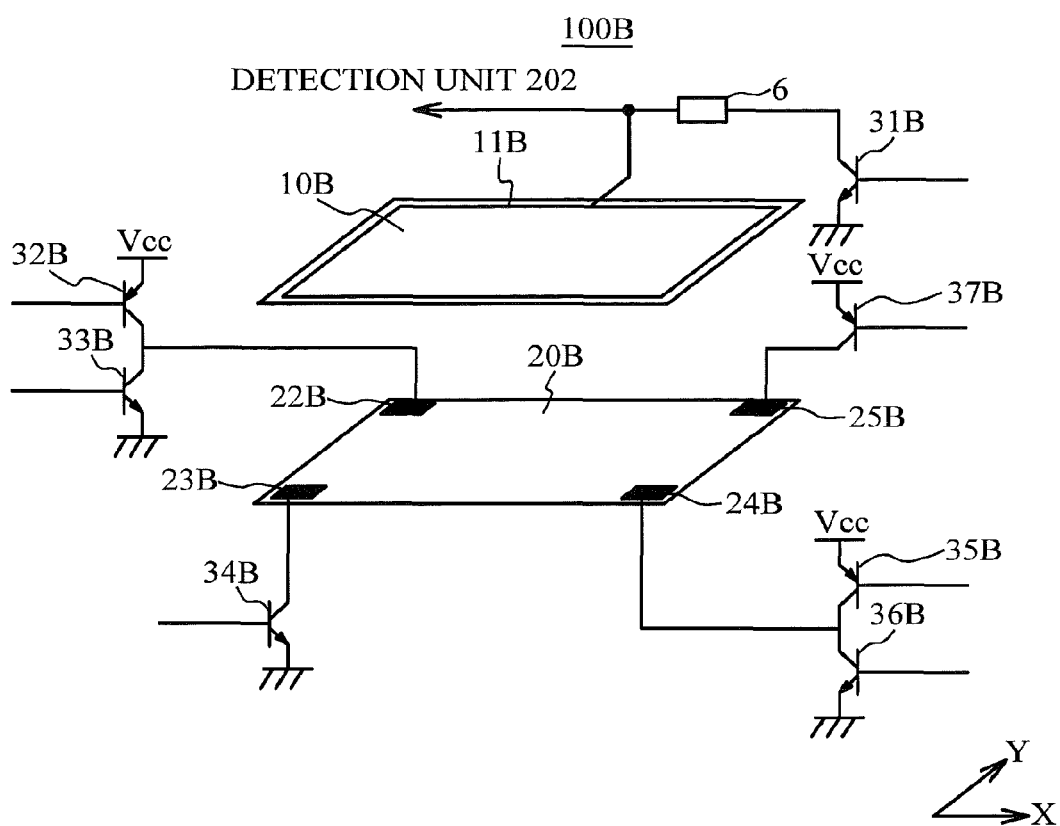
FIG. 2 is a diagram illustrating the configuration of a five-wire type touch panel 100B.

FIG. 2 is a diagram illustrating the configuration of a five-wire type touch panel 100B. The five-wire type touch panel 100B includes: resistance films 10B and 20B which are opposite to each other; electrodes 11B and 22B to 25B; switches 31B to 37B; and a pull-down resistor 6. In FIG. 2, a direction toward the electrode 24B from the electrode 23B is an X-direction, and a direction toward the electrode 22B from the electrode 23B is a Y-direction. Each of the resistance films 10B and 20B has a rectangular shape. Each of the switches 31B to 37B is a transistor. The electrode 11B is provided on the outer circumference of the resistance film 10B. The electrode 11B is connected to the detection unit 202 and the pull-down resistor 6. The pull-down resistor 6 is connected to a collector of the switch 31B. An emitter of the switch 31B is grounded.

The electrodes 22B to 25B are provided on the four corners of the resistance film 20B. The electrode 22B is connected to collectors of the switches 32B and 33B. The power supply voltage Vcc is applied to an emitter of the switch 32B. An emitter of the switch 33B is grounded. The electrode 23B is connected to a collector of the switch 34B. An emitter of the switch 34B is grounded. The electrode 24B is connected to collectors of the switches 35B and 36B. The power supply voltage Vcc is applied to an emitter of the switch 35B. An emitter of the switch 36B is grounded. The electrode 25B is connected to a collector of the switch 37B. The power supply voltage Vcc is applied to an emitter of the switch 37B.

The electrodes 11B and 22B to 25B have a function that controls the touch panel 100B by applying the power supply voltage Vcc to the resistance film 20B, and a function that performs the touch detection and the coordinate detection by detection of voltages. The resistance films 10B and 20B are overlapped so that the electrode 11B is opposite to the electrodes 22B to 25B. The resistance films 10B and 20B are separated via dot spacers, not shown, and contact with each other by the pressure of the touch. The touch panel 100B is controlled by the switches 31B to 37B connected to the electrodes 11B and 22B to 25B, and hence the touch detection and the coordinate detection are performed.

Figure 3:
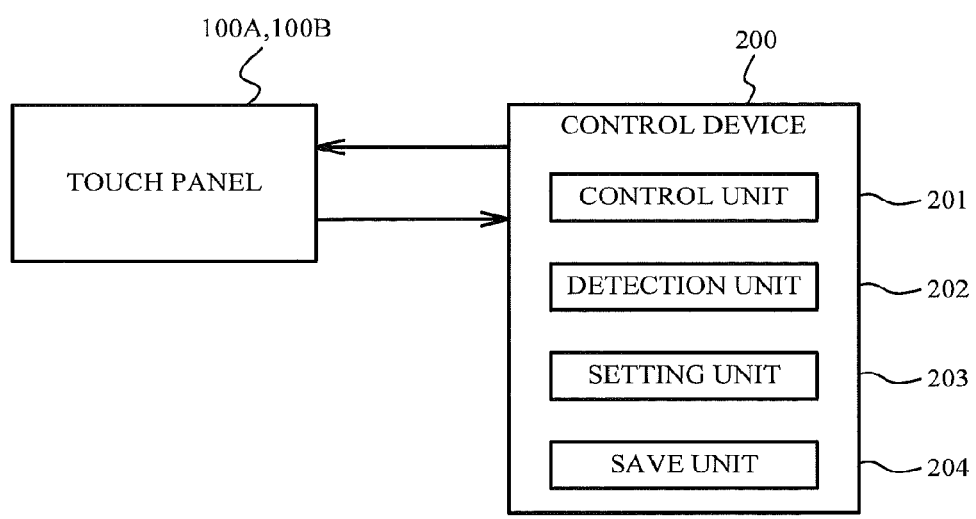
FIG. 3 is a diagram illustrating the configuration of a touch panel device according to an embodiment.

FIG. 3 is a diagram illustrating the configuration of the touch panel device according to the present embodiment. In FIG. 3, the touch panel device 1 includes the touch panel 100A or 100B, and a control device 200 connected thereto. The control device 200 includes: a control unit 201 that controls ON/OFF of the switches 31A to 35A provided in the touch panel 100A or the switches 31B to 37B provided in the touch panel 100B, and controls the operation of the whole touch panel; the detection unit 202 that detects a voltage between the resistance films by AD (Analog-to-Digital) conversion; a setting unit 203 that performs the setting of discharge time of electric charges accumulated between the resistance films, and the setting of a divisional number which divides the whole number of times in which the X-coordinate and the Y-coordinate of the touch position are measured, based on a command from the outside; and a save unit 204 that saves various setting values, amendment data, and so on. The control unit 201 functions as a controller which is an example of a control means and a detector which is an example of a detection means. The detection unit 202 functions as the detector. The setting unit 203 functions as a first setter which is an example of a first setting means and a second setter which is an example of a second setting means.

Moreover, the control unit 201 includes a counter that counts the number of times of detecting the XY-coordinates, and a calculation function that calculates coordinate data from voltage values detected by the detection unit 202. The control unit 201, the detection unit 202 and the setting unit 203 are composed of a microcomputer, for example. The save unit 204 is composed of a nonvolatile memory, for example.

Here, in the touch panel device 1, a seven-wire type touch panel may be used instead of the touch panel 100A or 100B.

Figure 4:
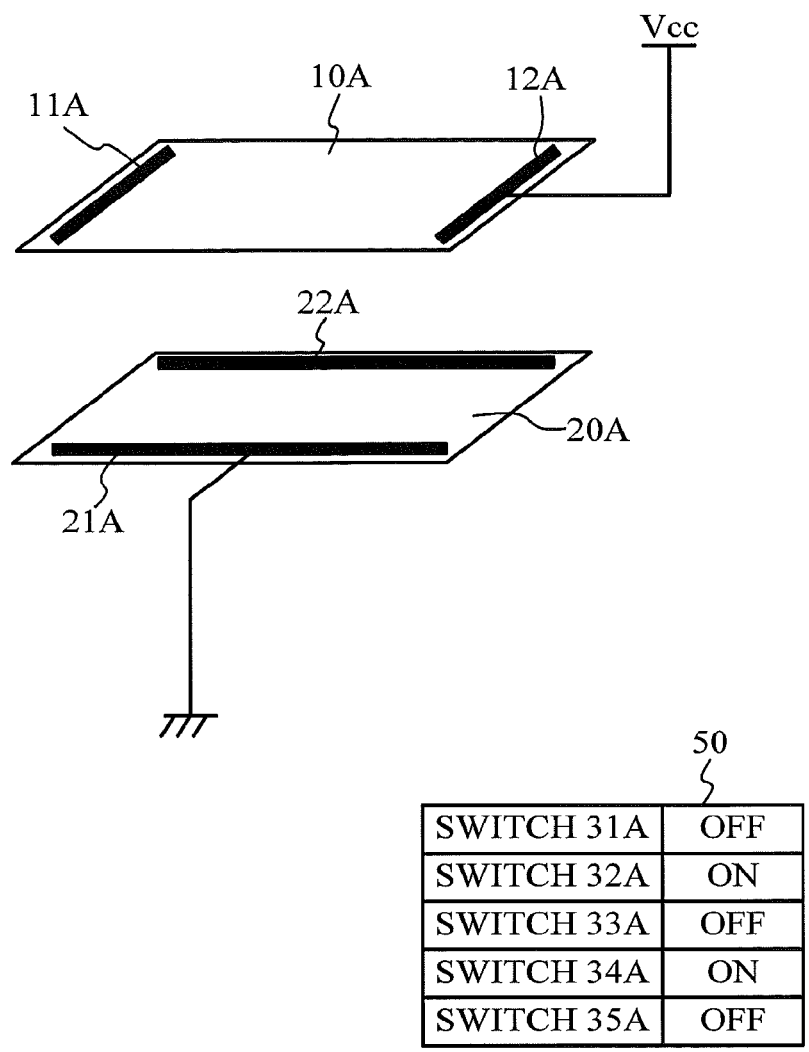
FIG. 4 is a diagram illustrating a state where the touch panel 100A at the time of touch detection is discharged.
Figure 5:
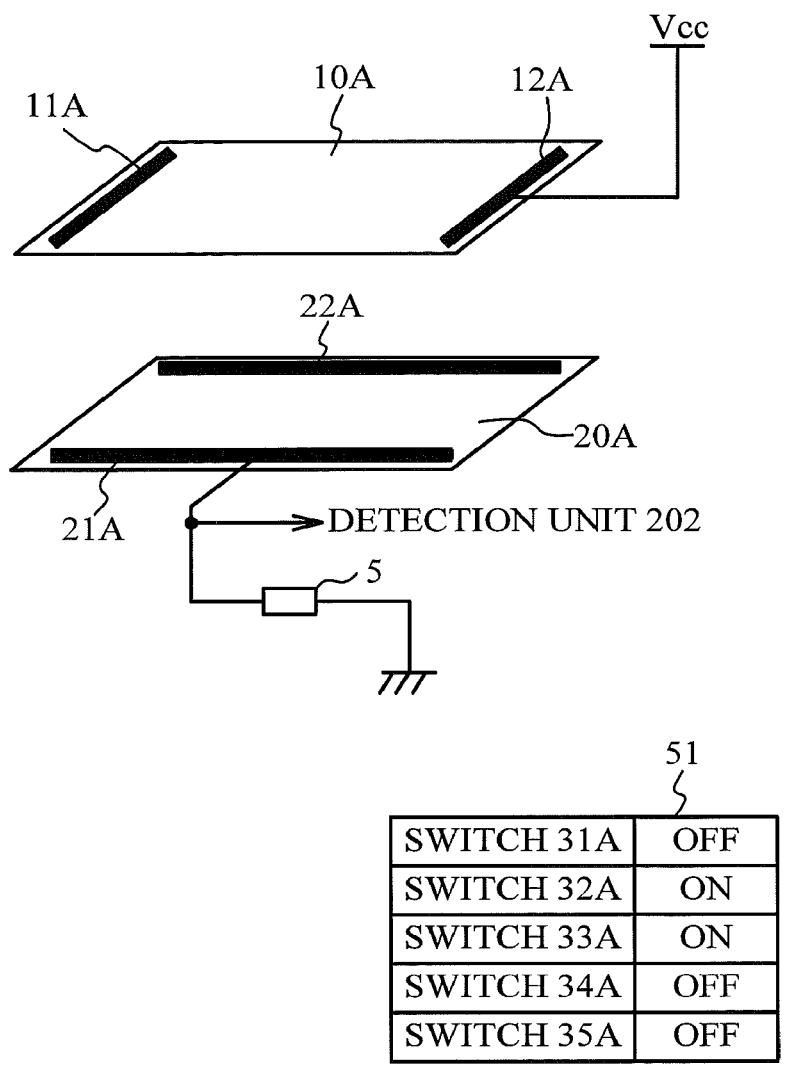
FIG. 5 is a diagram illustrating a state where the touch panel 100A at the time of the touch detection is charged.

FIG. 4 is a diagram illustrating a state where the touch panel 100A at the time of the touch detection is discharged. FIG. 5 is a diagram illustrating a state where the touch panel 100A at the time of the touch detection is charged. Although in FIGS. 4 and 5, the switches 31A to 35A are omitted for convenience, a state of each of the switches 31A to 35A is illustrated in tables 50 and 51. That is, the control unit 201 controls ON/OFF of the switches 31A to 35A, as illustrated in the tables 50 and 51.

In FIG. 4, each switch is controlled according to the state of the table 50, the resistance film 10A is connected to the power supply voltage Vcc, and the whole resistance film 10A becomes a voltage Vcc (High). The resistance film 20A is directly grounded, and the electric charges accumulated between the resistance films 10A and 20A are discharged.

After the discharge of the electric charges, the control unit 201 switches the switch 33A from OFF to ON, and switches the switch 34A from ON to OFF. Thereby, each switch becomes a state illustrated in the table 51, and the resistance film 20A is grounded via the pull-down resistor 5, as illustrated in FIG. 5. Thereby, the voltage measurement of the resistance film 20A is enabled by the detection unit 202. Then, the detection unit 202 detects the voltage of the electrode 21A when the resistance film 10A is touched. Since the resistance films 10A and 20A contact mutually at the time of touch-on, "High" is detected by the detection unit 202. At the time of touch-off, "Low" is detected by the detection unit 202. When the resistance films 10A and 20A are charged, the detection unit 202 may erroneously detect a touch-off state as touch-on by detecting a residual electric charge. However, in the present embodiment, since the electric charges accumulated between the resistance films 10A and 20A are discharged before the touch detection, the detection unit 202 does not erroneously detect the touch-off as the touch-on.

Moreover, since the electric charges accumulated between the resistance films 10A and 20A are discharged to a ground via the pull-down resistor 5 even when the state is switched from the touch-on to the touch-off, the detection unit 202 does not erroneously detect the touch-off as the touch-on by detecting the residual-electric charge.

Figure 6:
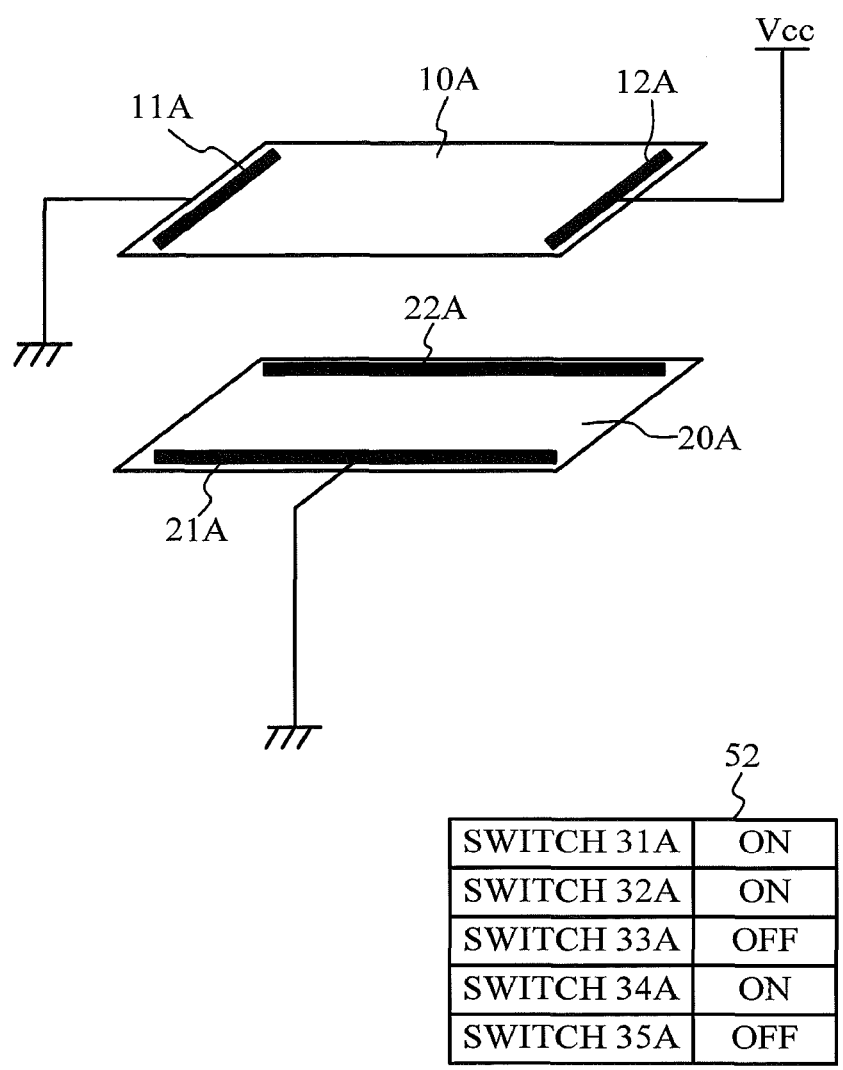
FIG. 6 is a diagram illustrating a state where the touch panel 100A at the time of detection of an X-coordinate is discharged.
Figure 7:
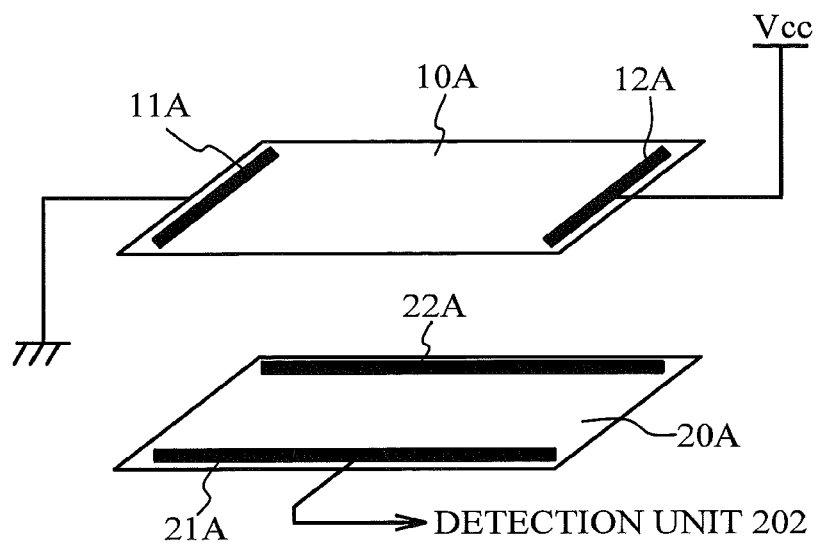
FIG. 7 is a diagram illustrating a state where the touch panel 100A at the time of detection of the X-coordinate is charged.

FIG. 6 is a diagram illustrating a state where the touch panel 100A at the time of detection of the X-coordinate is discharged. FIG. 7 is a diagram illustrating a state where the touch panel 100A at the time of detection of the X-coordinate is charged. Although in FIGS. 6 and 7, the switches 31A to 35A are omitted for convenience, a state of each of the switches 31A to 35A is illustrated in tables 52 and 53. That is, the control unit 201 controls ON/OFF of the switches 31A to 35A, as illustrated in the tables 52 and 53.

In FIG. 6, the electrode 11A is grounded and the electrode 12A is connected to the power supply voltage Vcc. Thereby, a potential gradient from 0 to Vcc occurs on the resistance film 10A. The resistance film 20A is grounded via the electrode 21A, and the electric charges accumulated between the resistance films 10A and 20A are discharged.

After the discharge of the electric charges, the control unit 201 switches the switch 34A from ON to OFF as illustrated in FIG. 7, and puts the resistance film 20A into a high impedance (HI-Z) state. Then, when an operator touches the resistance film 10A, the detection unit 202 detects a voltage corresponding to a touch position from a side of the resistance film 20A.

Figure 8:
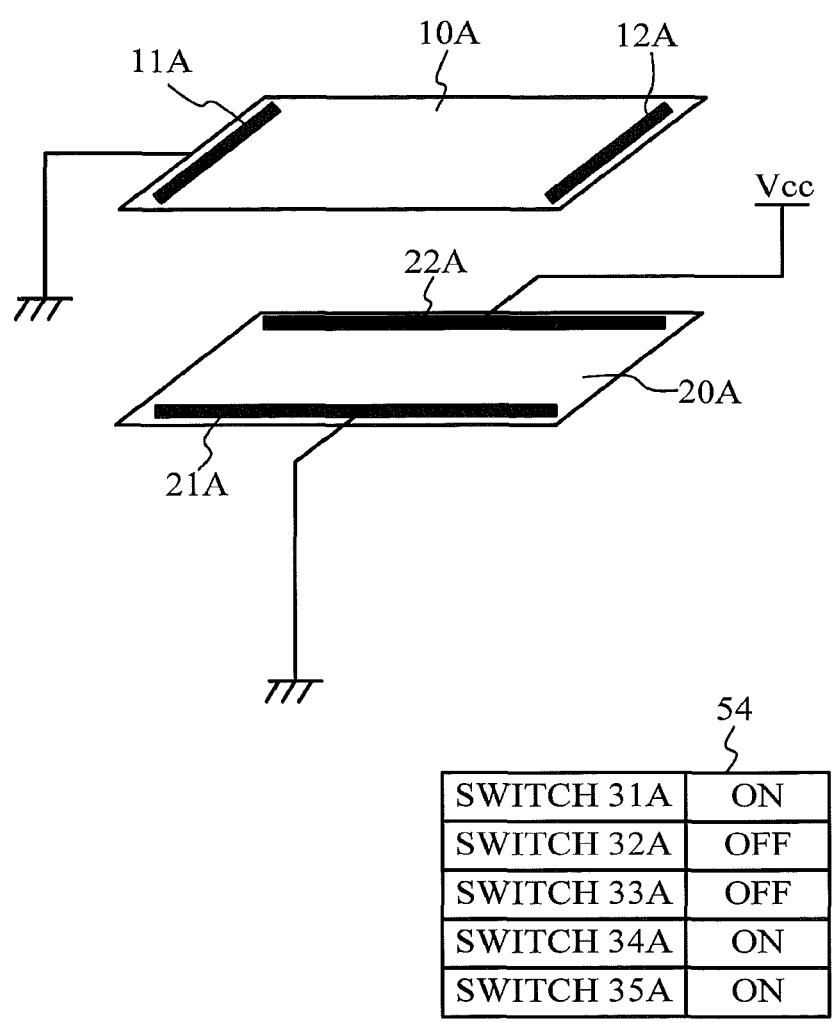
FIG. 8 is a diagram illustrating a state where the touch panel 100A at the time of detection of a Y-coordinate is discharged.
Figure 9:
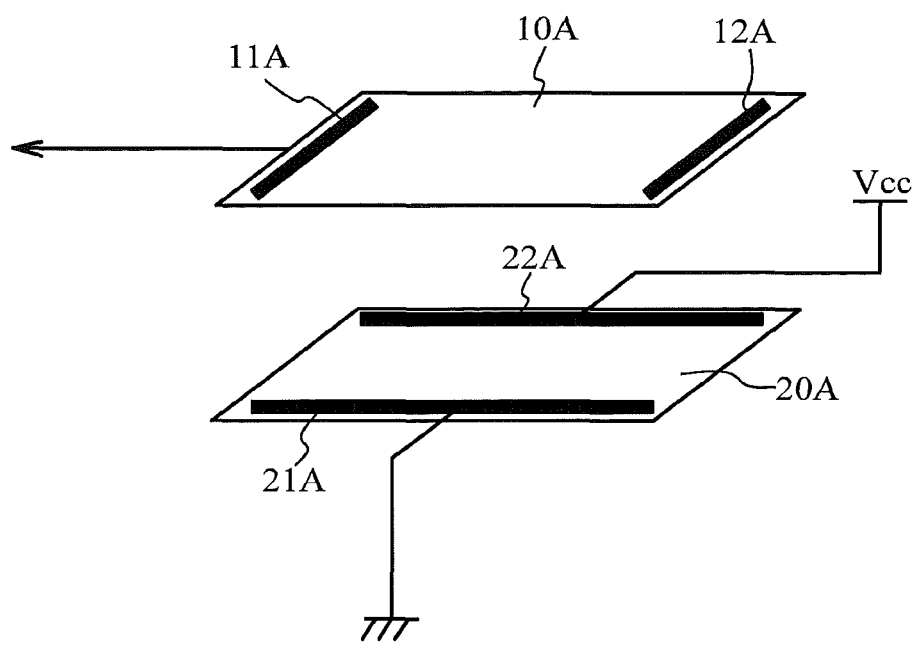
FIG. 9 is a diagram illustrating a state where the touch panel 100A at the time of detection of the Y-coordinate is charged.

FIG. 8 is a diagram illustrating a state where the touch panel 100A at the time of detection of the Y-coordinate is discharged. FIG. 9 is a diagram illustrating a state where the touch panel 100A at the time of detection of the Y-coordinate is charged. Although in FIGS. 8 and 9, the switches 31A to 35A are omitted for convenience, a state of each of the switches 31A to 35A is illustrated in tables 54 and 55. That is, the control unit 201 controls ON/OFF of the switches 31A to 35A, as illustrated in the tables 54 and 55.

In FIG. 8, the electrode 21A is grounded and the electrode 22A is connected to the power supply voltage Vcc. Thereby, the potential gradient from 0 to Vcc occurs on the resistance film 20A. The resistance film 10A is grounded via the electrode 11A, and the electric charges accumulated between the resistance films 10A and 20A are discharged.

After the discharge of the electric charges, the control unit 201 switches the switch 31A from ON to OFF as illustrated in FIG. 9, and puts the resistance film 10A into the high impedance (HI-Z) state. Then, when the operator touches the resistance film 10A, the detection unit 202 detects a voltage corresponding to a touch position from a side of the resistance film 10A.

Even when the state is switched from the touch-on to the touch-off during the detection of the XY-coordinates, an abnormality can be detected as described later, and hence malfunction, such as coordinate deviation, is restrained.

Figure 10:
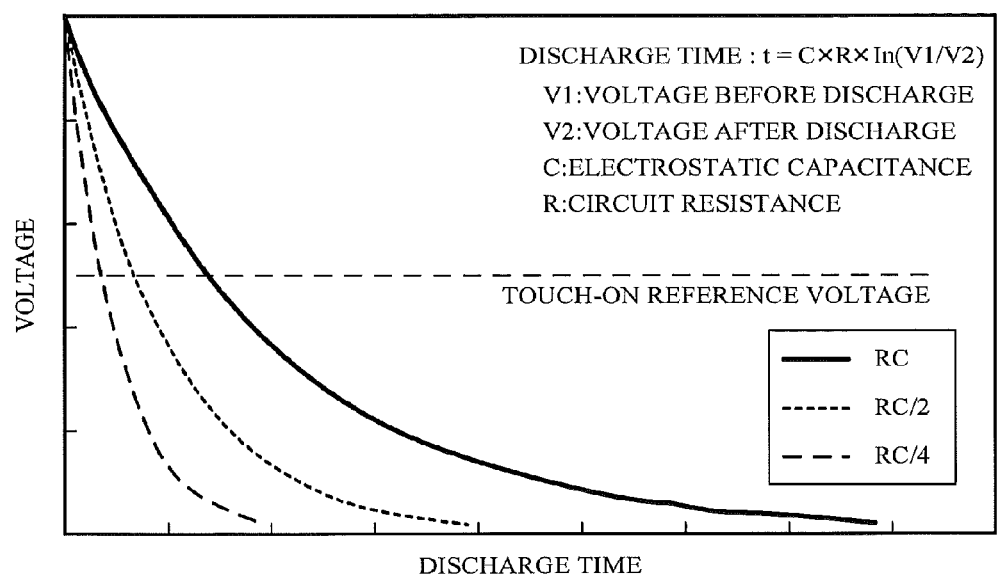
FIG. 10 is a diagram illustrating a relationship between a discharge time and a voltage of the touch panels 100A and 100B.

FIG. 10 is a diagram illustrating a relationship between a discharge time and a voltage of the touch panels 100A and 100B.

When the discharge time is represented by "t", a voltage between the resistance films before the discharge is represented by "V1", a voltage between the resistance films after the discharge is represented by "V2", an electrostatic capacitance between the resistance films is represented by "C", and a circuit resistance is represented by "R", the discharge time "t" is represented by the following formula.

$$t = C \times Rx \ln(V1/V2)$$

FIG. 10 illustrates differences of discharge times in the case of three kinds of RC, RC/2 and RC/4. It is understood that the discharge times become short as values of the RC, the RC/2 and the RC/4 become small in order. However, since the electrostatic capacitance C is determined for each touch panel, the electrostatic capacitance C cannot be changed. Therefore, in the present embodiment, by directly grounding the resistance film at the time of discharge, the circuit resistance R is made small and the discharge time is shortened. A touch-on reference voltage is a threshold value used in order that the control unit 201 judges that the touch panel is touched (i.e., touch-on) based on the voltage value detected by the detection unit 202. When the voltage value detected by the detection unit 202 exceeds the touch-on reference voltage, the control unit 201 judges that the touch panel is touched (i.e., touch-on). When the touch panel is not discharged sufficiently, the control unit 201 may erroneously detect the touch state as the touch-on by the electric charges on the touch panel, in spite of being the touch-off state originally. However, as clear from FIG. 10, the longer the discharge time, the longer a duration time of a state where the control unit 201 judges that the detected voltage exceeds the touch-on reference voltage. Therefore, in order to prevent erroneous detection of touch-on, it is desirable to discharge the touch panel within a shorter period.

Figure 11:
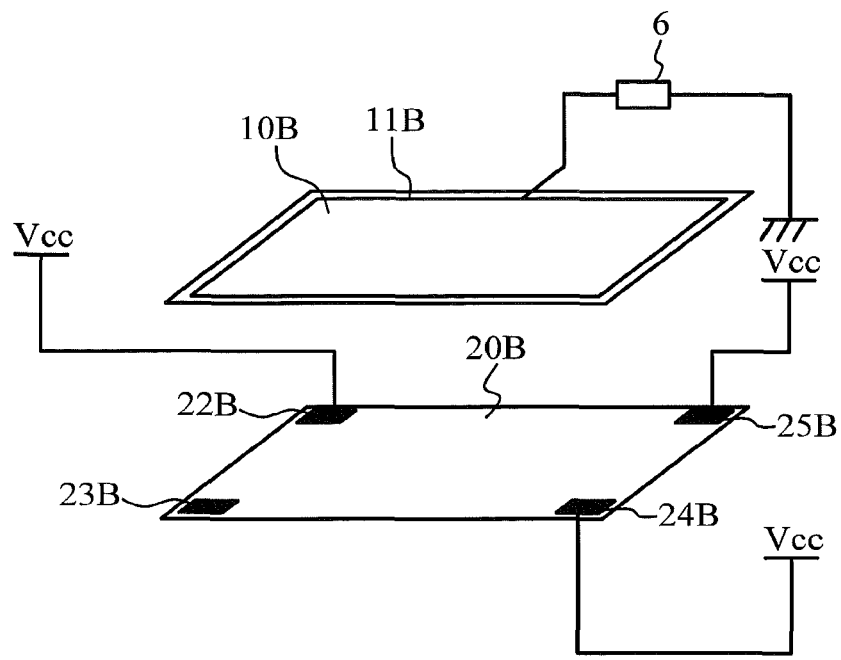
FIG. 11 is a diagram illustrating a state where the touch panel 100B at the time of the touch detection is discharged.
Figure 12:
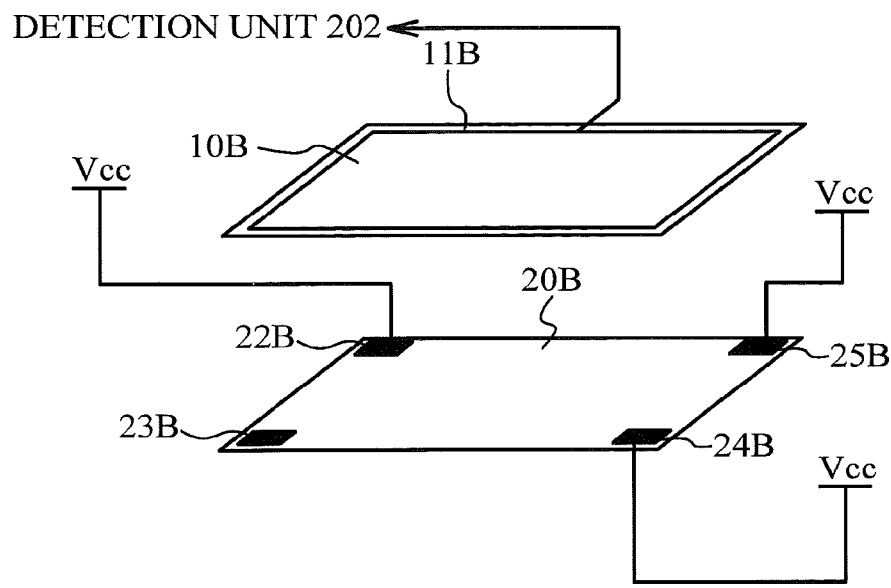
FIG. 12 is a diagram illustrating a state where the touch panel 100B at the time of the touch detection is charged.

FIG. 11 is a diagram illustrating a state where the touch panel 100B at the time of the touch detection is discharged. FIG. 12 is a diagram illustrating a state where the touch panel 100B at the time of the touch detection is charged. Although in FIGS. 11 and 12, the switches 31B to 37B are omitted for convenience, a state of each of the switches 31B to 37B is illustrated in tables 56 and 57. That is, the control unit 201 controls ON/OFF of the switches 31B to 37B, as illustrated in the tables 56 and 57.

In FIG. 11, the electrodes 22B, 24B and 25B of the resistance film 20B are connected to the power supply voltage Vcc, and the whole resistance film 20B becomes a voltage Vcc (High). The resistance film 10B is grounded via the pull-down resistor 6, and the electric charges accumulated between the resistance films 10B and 20B are discharged.

After the discharge of the electric charges, the control unit 201 switches the switch 31B from ON to OFF as illustrated in FIG. 12, and puts the resistance film 10B into the high impedance (HI-Z) state. Then, the detection unit 202 detects a voltage of the resistance film 10B when the resistance film 10B is touched. Since the resistance film 10B contacts with the resistance film 20B at the time of the touch-on, "high" is detected by the detection unit 202. At the time of the touch-off, "Low" is detected by the detection unit 202.

Figure 13:
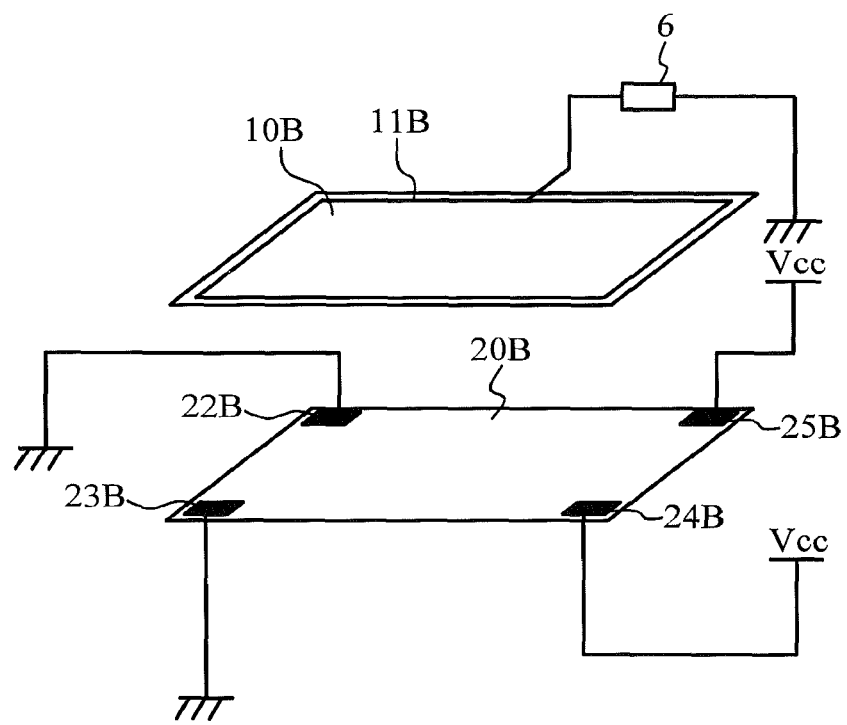
FIG. 13 is a diagram illustrating a state where the touch panel 100B at the time of detection of the X-coordinate is discharged.
Figure 14:
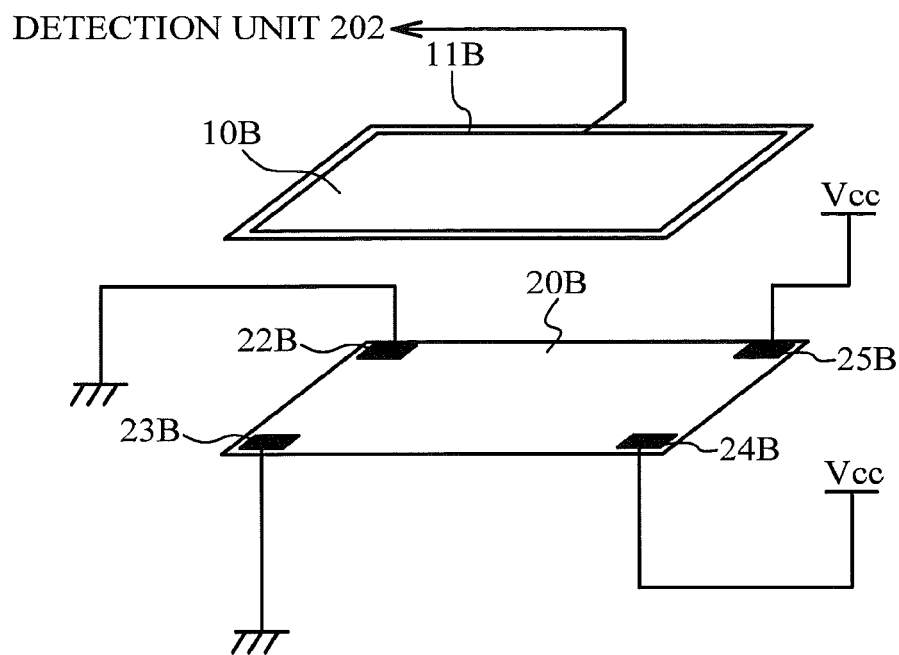
FIG. 14 is a diagram illustrating a state where the touch panel 100B at the time of detection of the X-coordinate is charged.

FIG. 13 is a diagram illustrating a state where the touch panel 100B at the time of detection of the X-coordinate is discharged. FIG. 14 is a diagram illustrating a state where the touch panel 100B at the time of detection of the X-coordinate is charged. Although in FIGS. 13 and 14, the switches 31B to 37B are omitted for convenience, a state of each of the switches 31B to 37B is illustrated in tables 58 and 59. That is, the control unit 201 controls ON/OFF of the switches 31B to 37B, as illustrated in the tables 58 and 59.

In FIG. 13, the electrodes 22B and 23B are grounded and the electrodes 24B and 25B are connected to the power supply voltage Vcc. Thereby, the potential gradient from 0 to Vcc occurs on the resistance film 20B. The resistance film 10B is grounded via the electrode 11B and the pull-down resistor 6, and the electric charges accumulated between the resistance films 10B and 20B are discharged.

After the discharge of the electric charges, the control unit 201 switches the switch 31B from ON to OFF as illustrated in FIG. 14, and puts the resistance film 10B into the high impedance (HI-Z) state. Then, when the operator touches the resistance film 10B, the detection unit 202 detects a voltage corresponding to a touch position from a side of the resistance film 10B.

Figure 15:
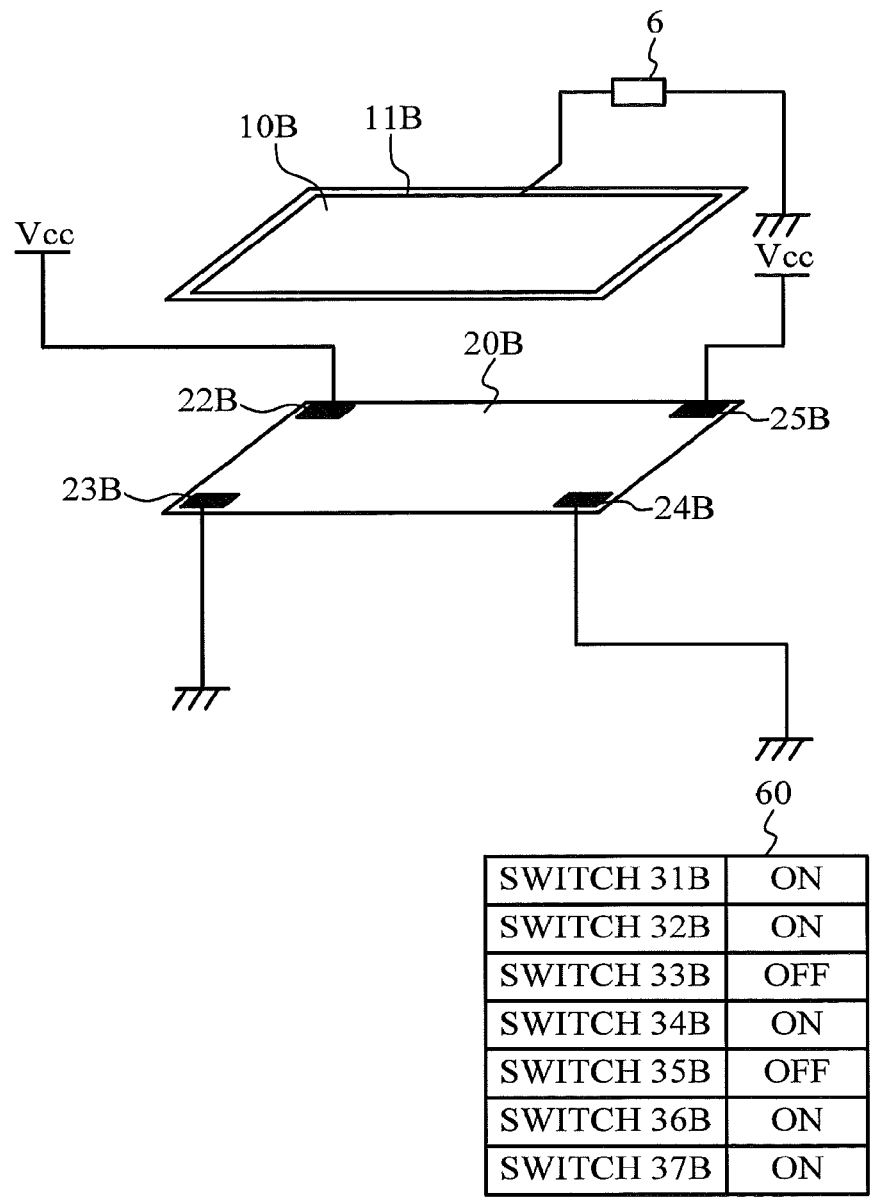
FIG. 15 is a diagram illustrating a state where the touch panel 100B at the time of detection of the Y-coordinate is discharged.
Figure 16:
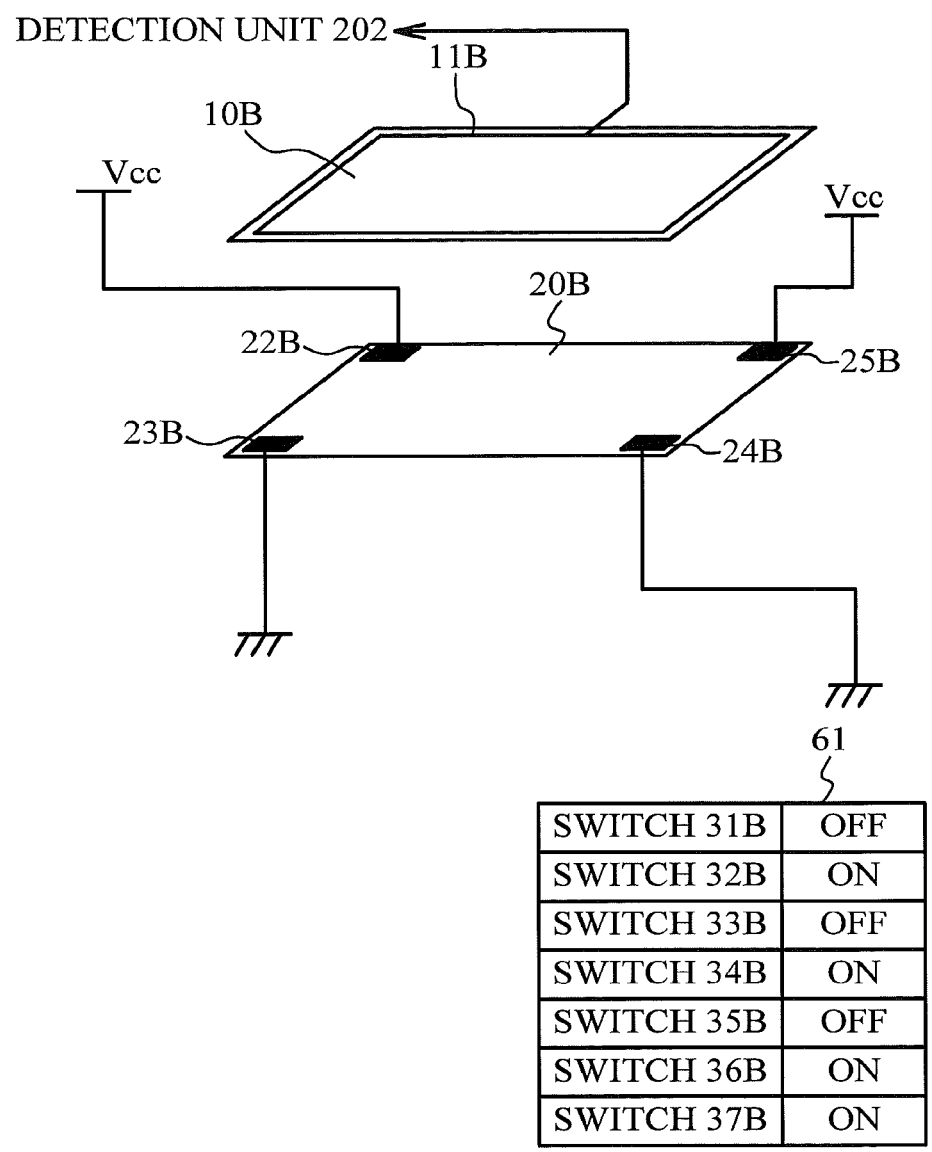
FIG. 16 is a diagram illustrating a state where the touch panel 100B at the time of detection of the Y-coordinate is charged.

FIG. 15 is a diagram illustrating a state where the touch panel 100B at the time of detection of the Y-coordinate is discharged. FIG. 16 is a diagram illustrating a state where the touch panel 100B at the time of detection of the Y-coordinate is charged. Although in FIGS. 15 and 16, the switches 31B to 37B are omitted for convenience, a state of each of the switches 31B to 37B is illustrated in tables 60 and 61. That is, the control unit 201 controls ON/OFF of the switches 31B to 37B, as illustrated in the tables 60 and 61.

In FIG. 15, the electrodes 23B and 24B are grounded and the electrodes 22B and 25B are connected to the power supply voltage Vcc. Thereby, the potential gradient from 0 to Vcc occurs on the resistance film 20B. The resistance film 10B is grounded via the electrode 11B and the pull-down resistor 6, and the electric charges accumulated between the resistance films 10B and 20B are discharged.

After the discharge of the electric charges, the control unit 201 switches the switch 31B from ON to OFF as illustrated in FIG. 16, and puts the resistance film 10B into the high impedance (HI-Z) state. Then, when the operator touches the resistance film 10B, the detection unit 202 detects a voltage corresponding to a touch position from the side of the resistance film 10B.

By the way, in the five-wire type touch panel 100B, the electrode 11B of the resistance film 10B is not directly grounded, so that the discharge of the electric charges at the time of the touch detection and the XY-coordinate detection takes time. Also in the four-wire type touch panel 100A, if the touch panel 100A is switched from the touch-on to the touch-off when sufficient discharge time is not set to the electrostatic capacitance, the electric charges are not discharged sufficiently, and the control unit 201 may erroneously detect the touch-on although the present state is touch-off. The judgment whether the touch-on is mistakenly detected is performed with the XY-coordinate detection.

Figure 17A:
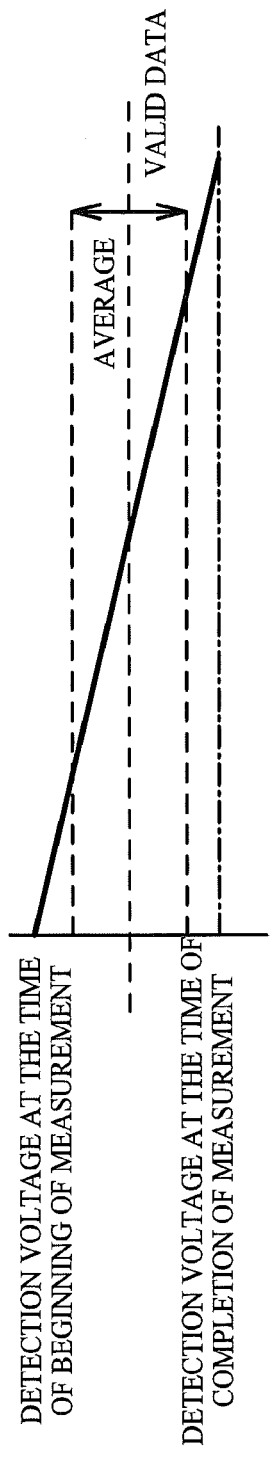
Figure 17B:
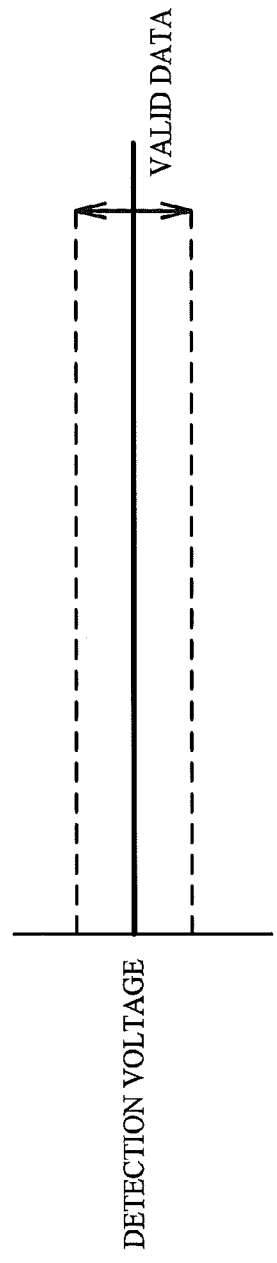
FIG. 17B is a diagram illustrating a state of a detection voltage at a normal time.

FIG. 17A is a diagram illustrating a state of a detection voltage when the resistance films are not discharged. FIG. 17B is a diagram illustrating a state of the detection voltage at a normal time. The normal time indicates a state where the discharge of the electric charges is completed and the X-coordinate and the Y-coordinate are detected without the coordinate deviation.

When the electric charges on the resistance films are not discharged, the electric charges accumulated between the resistance films are gradually discharged while the voltage on the resistance film is measured, as illustrated in FIG. 17A. Therefore, initially, the detection voltage is detected highly, and the detection voltage detected by the detecting unit 202 reduces gradually. Accordingly, in the case of FIG. 17A, the control unit 201 may erroneously detect the touch-off state as the touch-on state. On the contrary, at the normal time, i.e., when the electric charges on the resistance films are discharged sufficiently, the detection voltage detected by the detecting unit 202 is basically constant, and hence a possibility that erroneous detection of the touch-off state and the touch-on state occurs can be reduced. Here, valid data in FIGS. 17A and 17B is explained by a judgment process of the erroneous detection of the touch-on mentioned later.

Figure 18A:
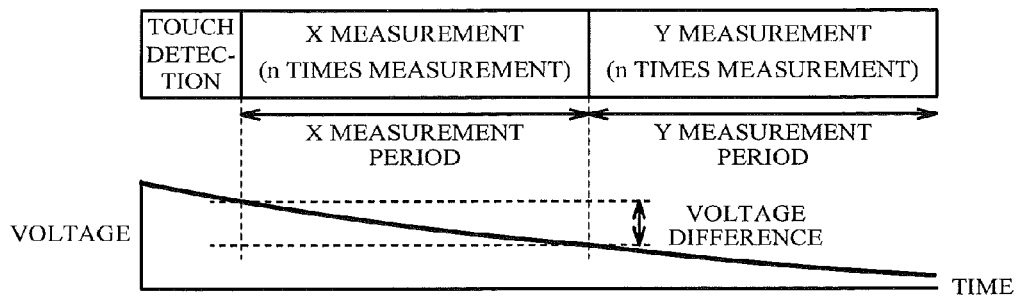
Figure 18B:
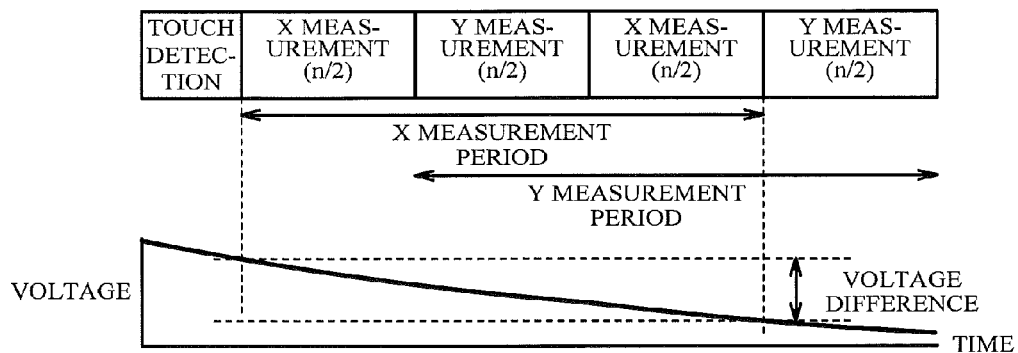
Figure 18C:
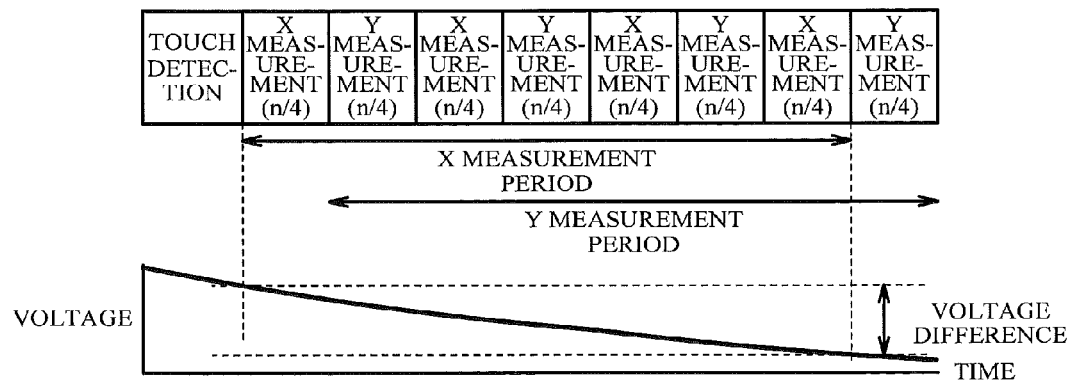

FIGS. 18A to 18C are diagrams schematically illustrating relationships between a measurement period of the coordinates and voltage change by the discharge when the detection voltage of the touch panel reduces gradually as illustrated in FIG. 17A. In the examples of FIGS. 18A to 18C, the detection unit 202 measures each of the X-coordinate and the Y-coordinate two or more times (i.e., n times; n=two or more) in order to improve detection accuracy. Moreover, periods from the start of measurement of the X-coordinate and the Y-coordinate to the end of measurement are called "an X-measurement period" and "a Y-measurement period", respectively.

The control unit 201 first performs a process of the touch detection. When the process of the touch detection is completed, the control unit 201 performs the XY-coordinate detection.

FIG. 18A illustrates an example in which the measurement of the X-coordinate is performed n times in advance, and next the measurement of the Y-coordinate is performed n times. Here, as illustrated in FIG. 18A, a voltage difference occurs between the detecting voltages at the start and the end of each of the X-measurement period and the Y-measurement period according to the discharge of the touch panel. Here, when the detection unit 202 measures the Y-coordinate n times after measuring the X-coordinate n times, the change (i.e., the voltage difference) between the detection voltages at the time of the start and the end of the X-measurement period becomes minute, and hence there is a possibility that the detection voltages exceed the touch-on reference voltage when the discharge is insufficient. In this case, the control unit 201 may erroneously detect the present state as the touch-on although the present state is touch-off.

In the present embodiment, the control unit 201 divides the number of times (i.e., n times) of the measurement of the X-coordinate and the number of times (i.e., n times) of the measurement of the Y-coordinate by a given number, and the detection unit 202 alternately measures the X-coordinate and the Y-coordinate according to the number of times of the division. FIG. 18B illustrates an example in which the number of times of the measurement of the X-coordinate and the Y-coordinate are divided into two (n/2). FIG. 18C illustrates an example in which the number of times of the measurement of the X-coordinate and the Y-coordinate are divided into four (n/4). The number of times (i.e., n times) of the measurement of the X-coordinate and the Y-coordinate and the given number for dividing the number of times of the measurement are set by the setting unit 203 and can be changed.

Although the whole measurement period of each of FIGS. 18B and 18C is the same as the whole measurement period of FIG. 18A, the X-measurement period of each of FIGS. 18B and 18C becomes longer than the X-measurement period of FIG. 18A. Similarly, the Y-measurement period of each of FIGS. 18B and 18C becomes longer than the Y-measurement period of FIG. 18A. Thereby, since the change (i.e., the voltage difference) between the detection voltages within the respective measurement periods in the case of each of FIGS. 18B and 18C becomes larger than the change between the detection voltages of FIG. 18A, the detection voltage at the end of the measurement period further lowers, and hence the erroneous detection of the touch-on by the control unit 201 can be avoided. That is, in FIGS. 18B and 18C, it is easy to obtain a measurement value which becomes invalid essentially, compared with the case of FIG. 18A. Since the measurement of the X-coordinate and the Y-coordinate are divided and performed alternately, the X-measurement period and the Y-measurement period are extended without extending the whole measurement period. Therefore, a minute change between the detection voltages can be detected.

Figure 19:
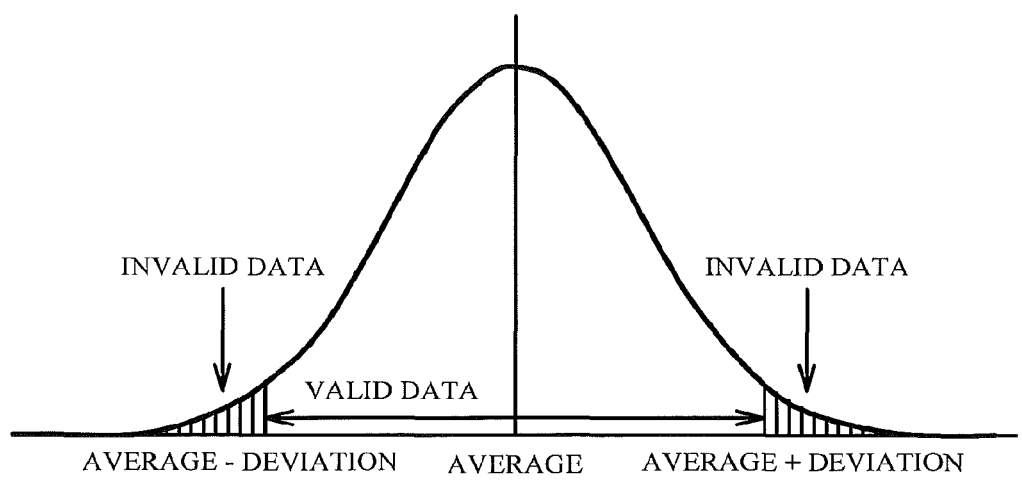
FIG. 19 is a diagram illustrating normal distribution of a plurality of detected coordinate values.

Here, a detailed description will be given of a judgment process of the erroneous detection of the touch-on. First, the control unit 201 removes invalid values (i.e., invalid data) from n X-coordinates and n Y-coordinates (e.g., both coordinates are detected as voltages) measured by the detection unit 202. For example, the control unit 201 calculates an average of the n X-coordinate values, sets, as valid data, X-coordinate values included in a range decided by adding a given deviation to the average value and subtracting the given deviation from the average value, and sets, as invalid data, X-coordinate values which is not included in the range, as illustrated in FIG. 19. In a similar way, the control unit 201 calculates valid data and invalid data about the Y-coordinate values. For example, the given deviation is a standard deviation about the X-coordinate values or the Y-coordinate values, or twice the standard deviation.

Then, the control unit 201 judges whether the number of valid data of the X-coordinate values and the Y-coordinates is equal to or more than a threshold value. When the number of valid data is equal to or more than the threshold value, the control unit 201 sets an average of the valid data about the X-coordinate values to an X-coordinate value, and sets an average of the valid data about the Y-coordinate values to a Y-coordinate value. On the other hand, when the number of valid data of the X-coordinate values or the Y-coordinates is less than the threshold value, the control unit 201 judges that the measurement is an error, i.e., the erroneous detection of the touch-on. For example, it is assumed that the number of times of measurement of each of the X-coordinate and the Y-coordinate is 20 times and the threshold value of the number of valid data is 15. In this case, when the number of valid data is equal to or more than 15, the control unit 201 sets the average of the valid data about the X-coordinate values to the X-coordinate value, and sets the average of the valid data about the Y-coordinate values to the Y-coordinate value. On the other hand, when the number of valid data of at least any one of the X-coordinate values and the Y-coordinate values is less than 15, the control unit 201 judges that the measurement is the error, i.e., the erroneous detection of the touch-on.

Figure 20:
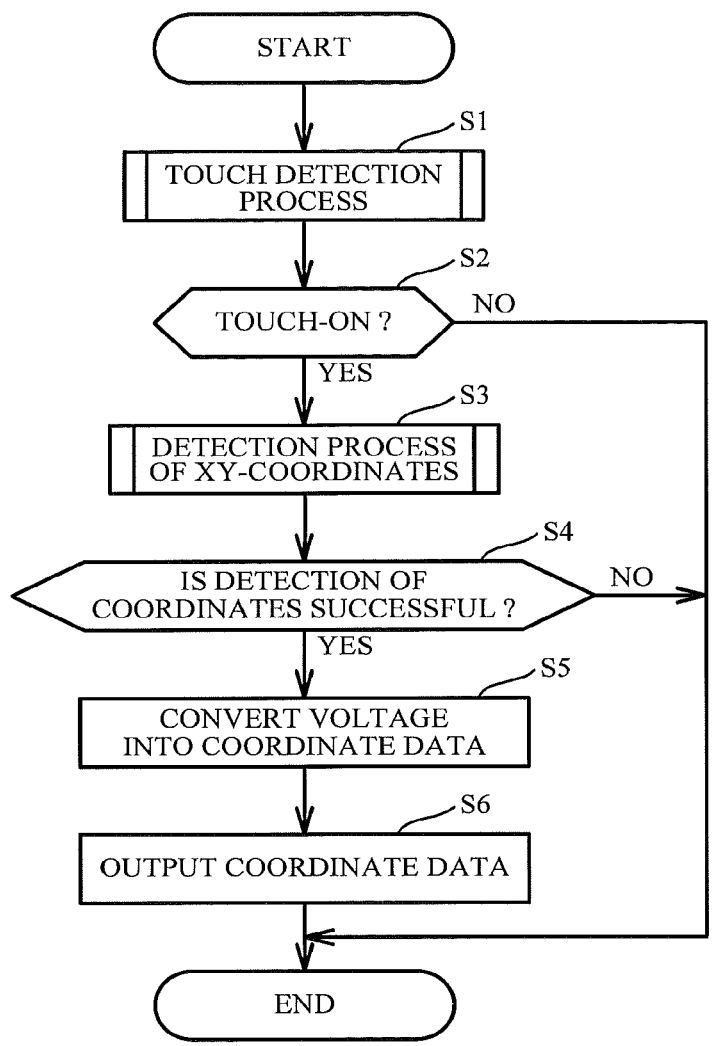
FIG. 20 is a flowchart illustrating processes to be performed by a touch panel device 1.

FIG. 20 is a flowchart illustrating processes to be performed by the touch panel device 1. The control unit 201 in the control device 200 first performs a touch detection process (step S1). The touch detection process is described later in detail.

Next, the control unit 201 judges whether the touch-on is detected (step S2). When it is judged that the touch-on is not detected (NO in step S2), the present process is terminated. On the other hand, when it is judged that the touch-on is detected (YES in step S2), the control unit 201 performs a detection process of XY-coordinates (step S3). The detection process of the XY-coordinates is described later in detail.

Next, the control unit 201 judges whether the detection of the XY-coordinates is successful (step S4). When it is judged that the detection of the XY-coordinates is failure (NO in step S4), the present process is terminated. When it is judged that the detection of the XY-coordinates is successful (YES in step S4), the control unit 201 converts voltages of the X-coordinates and the Y-coordinates detected as the valid data into coordinate data (step S5), and outputs the coordinate data (step S6). For example, the coordinate data is outputted to an application, a program, an operating system (OS), or the like. In addition, since a plurality of voltages of each of the X-coordinates and Y-coordinates are detected as described later, the control unit 201 converts an average of the voltages of the X-coordinates and an average of the voltages of the Y-coordinates into the coordinate data in step S5.

Figure 21A:
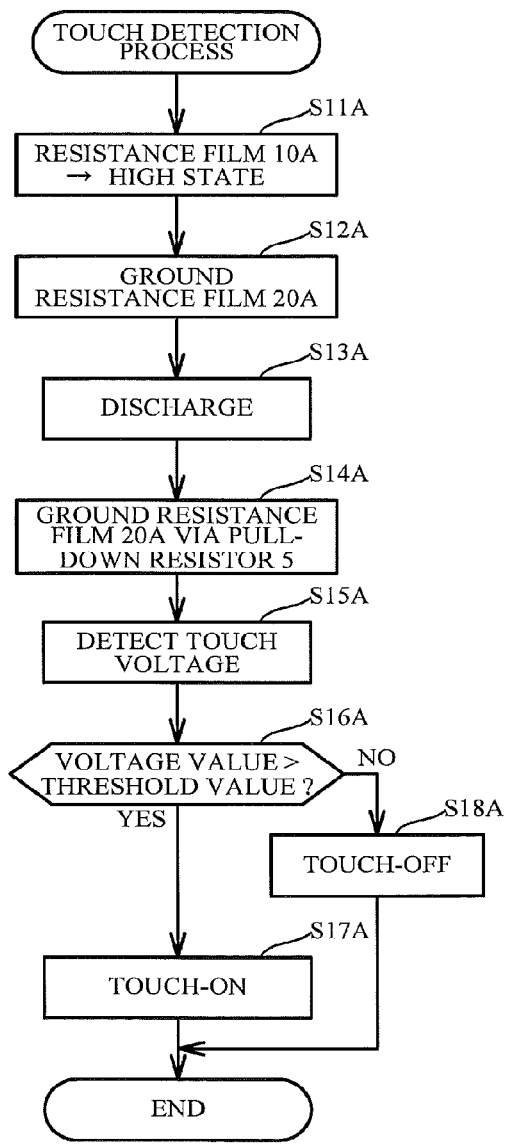
FIG. 21A is a flowchart illustrating a touch detection process of the four-wire type touch panel 100A.
Figure 21B:
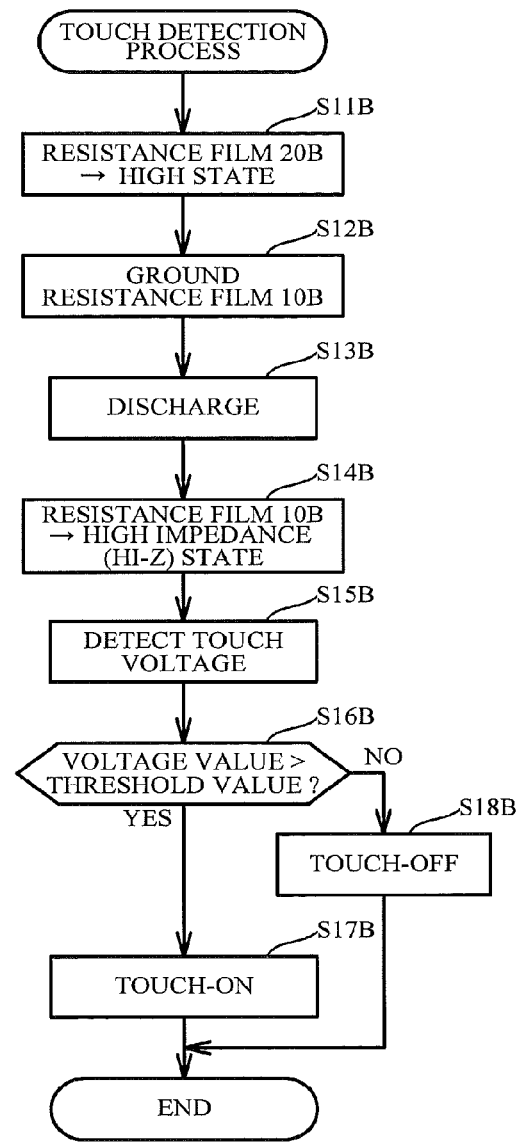
FIG. 21B is a flowchart illustrating a touch detection process of the five-wire type touch panel 100B.

FIGS. 21A and 21B are flowcharts illustrating the touch detection process of step S1 in FIG. 20. FIG. 21A illustrates the touch detection process of the four-wire type touch panel 100A. FIG. 21B illustrates the touch detection process of the five-wire type touch panel 100B.

In FIG. 21A, the control unit 201 puts the whole resistance film 10A into the high state by turning off the switch 31A and turning on the switch 32A (step S11A). Next, the control unit 201 grounds the resistance film 20A by turning off the switches 33A and 35A and turning on the switch 34A (step S12A). The electric charges accumulated between the resistance films 10A and 20A are discharged by this operation (step S13A). Here, since the discharge time is set by the setting unit 203 and is saved beforehand in the save unit 204, the control unit 201 reads out the discharge time from the save unit 204 and waits until the discharge time passes.

When the discharge time passes, the control unit 201 grounds the resistance film 20A via the pull-down resistor 5 by turning on the switch 33A and turning off the switch 34A (step S14A). Then, the detection unit 202 detects a voltage when the resistance film 10A is touched (step S15A).

The control unit 201 judges whether the voltage value detected by the detection unit 202 exceeds a threshold value (step S16A). When it is judged that the detected voltage value exceeds the threshold value (YES in step S16A), the control unit 201 judges that the state of the touch panel 100A is the touch-on (step S17A), and the present process is terminated. On the other hand, when it is judged that the detected voltage value does not exceed the threshold value (NO in step S16A), the control unit 201 judges that the state of the touch panel 100A is the touch-off (step S18A), and the present process is terminated.

In FIG. 21B, the control unit 201 puts the whole resistance film 20B into the high state by turning off the switches 33B, 34B and 36B and turning on the switches 32B, 35B and 37B (step S11B). Next, the control unit 201 grounds the resistance film 10B via the pull-down resistor 6 by turning on the switch 31B (step S12B). The electric charges accumulated between the resistance films 10B and 20B are discharged by this operation (step S13B). Here, since the discharge time is set by the setting unit 203 and is saved beforehand in the save unit 204, as with FIG. 21A, the control unit 201 reads out the discharge time from the save unit 204 and waits until the discharge time passes.

When the discharge time passes, the control unit 201 turns off the switch 31B and puts the resistance film 10B into the high impedance (HI-Z) state (step S14B). Then, the detection unit 202 detects a voltage when the resistance film 10B is touched (step S15B).

The control unit 201 judges whether the voltage value detected by the detection unit 202 exceeds a threshold value (step S16B). When it is judged that the detected voltage value exceeds the threshold value (YES in step S16B), the control unit 201 judges that the state of the touch panel 100B is the touch-on (step S17B), and the present process is terminated. On the other hand, when it is judged that the detected voltage value does not exceed the threshold value (NO in step S16B), the control unit 201 judges that the state of the touch panel 100B is the touch-off (step S18B), and the present process is terminated.

Figure 22:
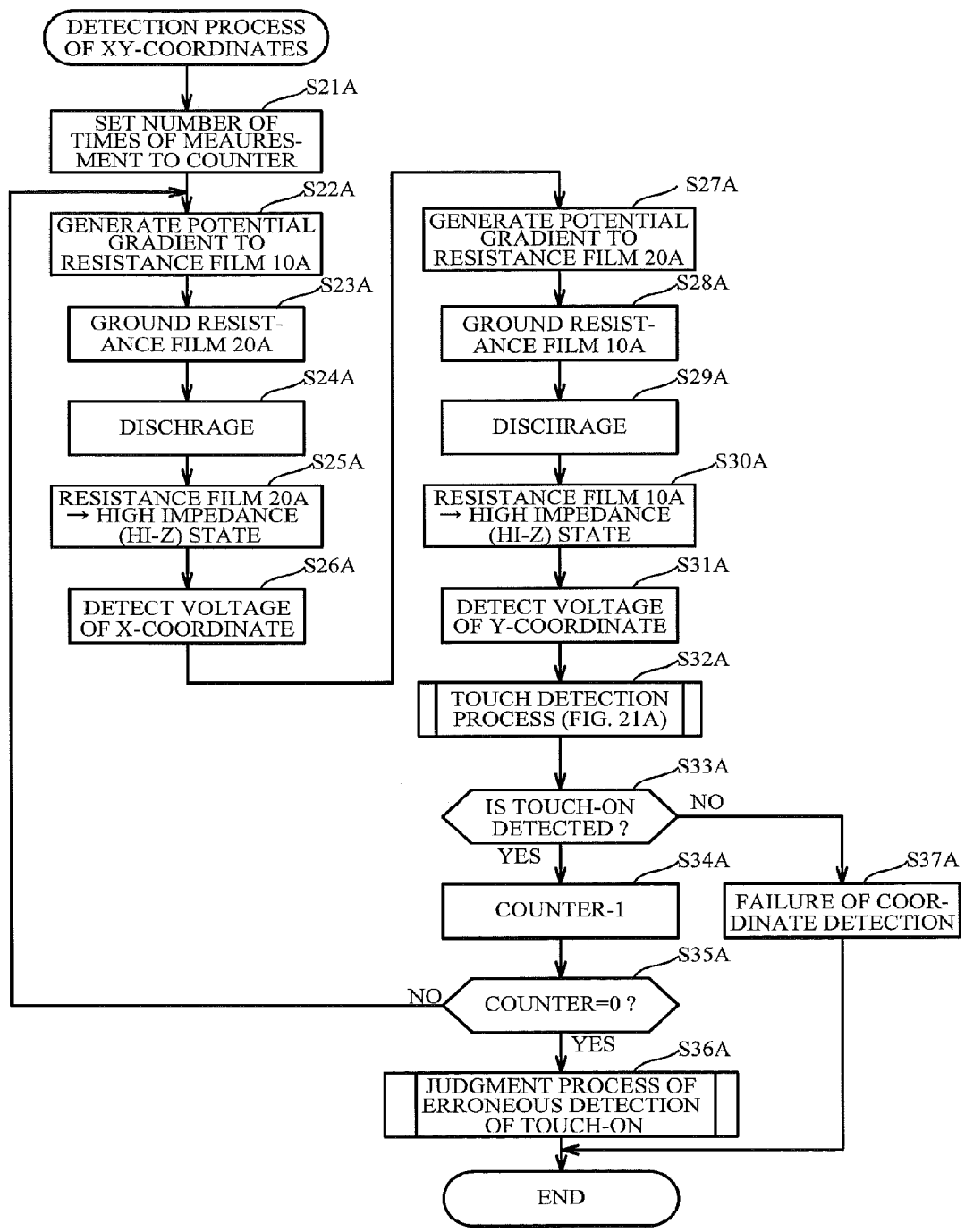
FIG. 22 is a flowchart illustrating a detection process of XY-coordinates of step S3 in FIG. 20.

FIG. 22 is a flowchart illustrating a detection process of the XY-coordinates of step S3 in FIG. 20. Here, the detection process of the XY-coordinates of the four-wire type touch panel 100A is illustrated.

The control unit 201 sets the number of times (i.e., n times) of the measurement of the X-coordinate and the Y-coordinate to counters, respectively (step S21A). The counters are used to judge whether the measurement of the given number of times (i.e., n times) of the coordinate values is performed. Since the number of times of the measurement of the X-coordinate and the Y-coordinate is set by the setting unit 203 and is saved beforehand in the save unit 204, the control unit 201 reads out the number of times (i.e., n times) of the measurement of the X-coordinate and the Y-coordinate from the save unit 204 and sets the number of times (i.e., n times) of the measurement to the counters. The following process is performed for each of the X-coordinate and the Y-coordinate.

First, the control unit 201 generates a potential gradient from 0 to Vcc to the resistance film 10A by tuning on the switches 31A and 32A (step S22A). Next, the control unit 201 grounds the resistance film 20A by turning off the switches 33A and 35A and turning on the switch 34A (step S23A). The electric charges accumulated between the resistance films 10A and 20A are discharged by this operation (step S24A). Here, since the discharge time is set by the setting unit 203 and is saved beforehand in the save unit 204, the control unit 201 reads out the discharge time from the save unit 204 and waits until the discharge time passes.

When the discharge time passes, the control unit 201 puts the resistance film 20A into the high impedance (HI-Z) state by turning off the switch 34A (step S25A). Then, the detection unit 202 detects a voltage corresponding to the X-coordinate of the touch position (step S26A).

Next, the control unit 201 generates the potential gradient from 0 to Vcc to the resistance film 20A by tuning on the switches 34A and 35A and turning off the switch 33A (step S27A). The control unit 201 grounds the resistance film 10A by turning off the switch 31A and turning on the switch 32A (step S28A). Thereby, the electric charges accumulated between the resistance films 10A and 20A are discharged (step S29A). Here, since the discharge time is set by the setting unit 203 and is saved beforehand in the save unit 204, the control unit 201 reads out the discharge time from the save unit 204 and waits until the discharge time passes.

When the discharge time passes, the control unit 201 puts the resistance film 10A into the high impedance (HI-Z) state by turning off the switch 31A (step S30A). The detection unit 202 detects a voltage corresponding to the Y-coordinate of the touch position (step S31A). Then, the touch detection process of FIG. 21A is performed (step S32A).

The control unit 201 judges whether the touch-on is detected by the touch detection process (step S33A). When it is judged that the touch-on is not detected (NO in step S33A), the control unit 201 judges that the detection of the X-coordinate and the Y-coordinate is failure (step S37A), and the present process is terminated. When it is judged that the touch-on is detected (YES in step S33A), the control unit 201 decrements the value of the counter by 1 (step S34A). The control unit 201 judges whether the value of the counter is 0 (step S35A).

When it is judged that the value of the counter is not 0 (NO in step S35A), the process returns to step S22A. On the other hand, when it is judged that the value of the counter is 0 (YES in step S35A), the control unit 201 performs the judgment process of the erroneous detection of the touch-on (step S36A), and the present process is terminated. Here, since the detection of the X-coordinate and the Y-coordinate is repeatedly performed as illustrated by steps S22A to S31A before the value of the counter becomes 0, the detection unit 202 detects the plurality of X-coordinates and the plurality of Y-coordinates.

Figure 23:
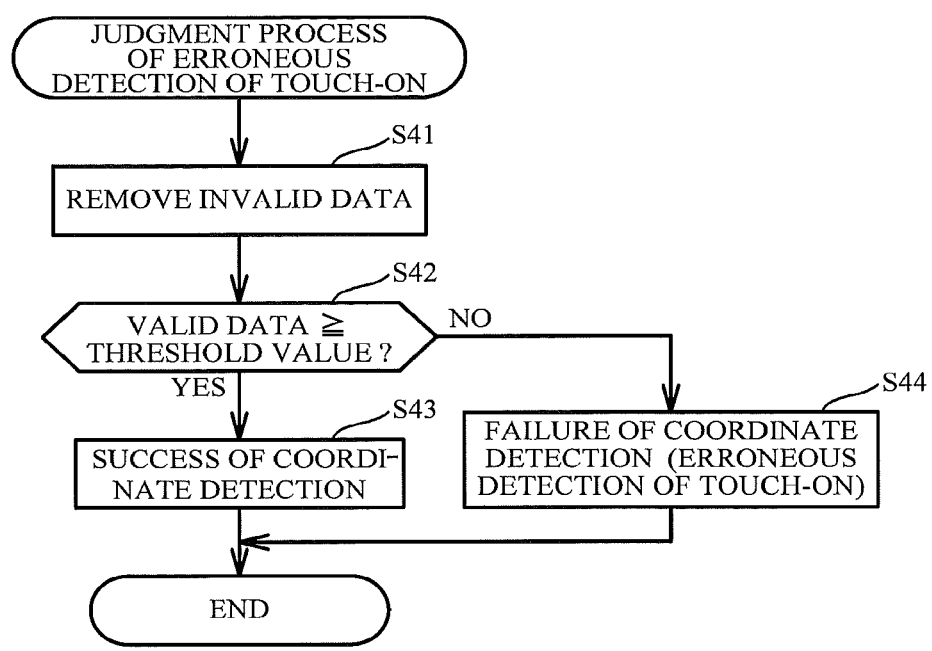
FIG. 23 is a flowchart illustrating a determination process of erroneous detection of touch-on of step S36A in FIG. 22.

FIG. 23 is a flowchart illustrating the determination process of the erroneous detection of the touch-on of step S36A in FIG. 22. Here, it is assumed that, in the detection process of the XY-coordinates, n X-coordinates and n Y-coordinates are detected (n=two or more).

First, the control unit 201 removes invalid data from n X-coordinate values and n Y-coordinate values measured by the detection unit 202 (step S41). For example, the control unit 201 calculates an average of the n X-coordinate values, sets, as the valid data, X-coordinate values included in a range decided by adding a given deviation to the average value and subtracting the given deviation from the average value, and sets, as the invalid data, X-coordinate values which is not included in the range, as illustrated in FIG. 19. In a similar way, the control unit 201 calculates the valid data and the invalid data about the Y-coordinate values.

Next, the control unit 201 judges whether the number of valid data is equal to or more than a threshold value (step S42). Here, the threshold value can be changed by the setting unit 203.

When it is determined that the number of valid data is equal to or more than the threshold value (YES in step S42), the control unit 201 judges that the detection of the X-coordinate and the Y-coordinate is successful (step S43), and the present process is terminated. On the other hand, when it is determined that the number of valid data is less than the threshold value (NO in step S42), the control unit 201 judges that the detection of the X-coordinate and the Y-coordinate is failure, i.e., the erroneous detection of the touch-on (step S44), and the present process is terminated. In the process explained above, although the detection of the Y-coordinate is performed after the detection of the X-coordinate, the detection of the X-coordinate may be performed after the detection of the Y-coordinate.

Figure 24:
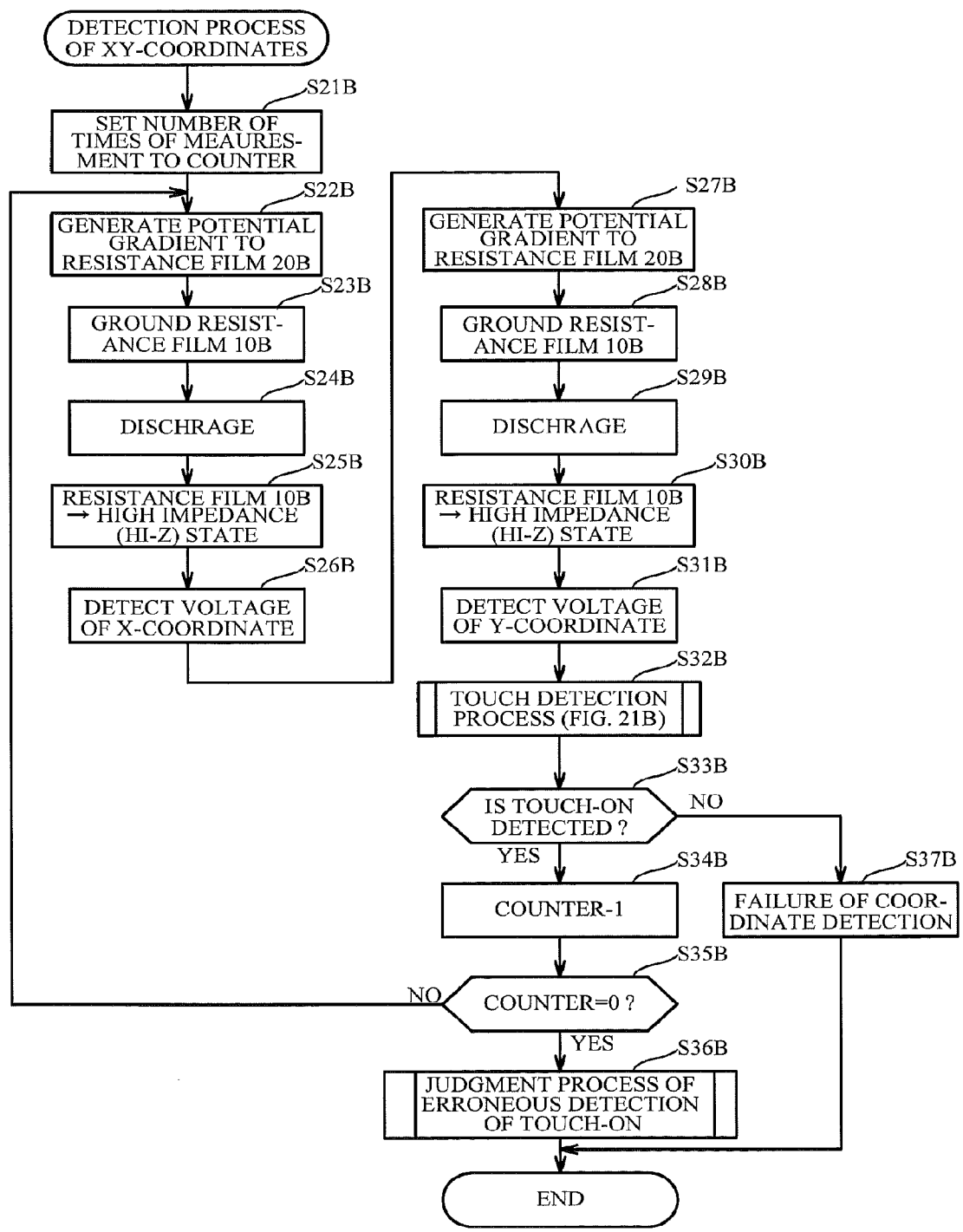
FIG. 24 is a flowchart illustrating a detection process of XY-coordinates of step S3 in FIG. 20.

FIG. 24 is a flowchart illustrating the detection process of the XY-coordinates of step S3 in FIG. 20 when the five-wire type touch panel 100B is used.

The control unit 201 sets the number of times of the measurement of the X-coordinate and the Y-coordinate to counters, respectively (step S21B). Here, since the number of times of the measurement of the X-coordinate and the Y-coordinate is set by the setting unit 203 and is saved beforehand in the save unit 204, the control unit 201 reads out the number of times of the measurement of the X-coordinate and the Y-coordinate from the save unit 204 and sets the number of times of the measurement of the X-coordinate and the Y-coordinate to the counters.

First, the control unit 201 generates the potential gradient from 0 to Vcc to the resistance film 20B by tuning on the switches 33B to 35B and 37B, and turning off the switch 32B and 36B (step S22B). The control unit 201 grounds the resistance film 10B via the pull-down resistor 6 by turning on the switch 31B (step S23B). The electric charges accumulated between the resistance films 10B and 20B are discharged (step S24B). Here, since the discharge time is set by the setting unit 203 and is saved beforehand in the save unit 204, the control unit 201 reads out the discharge time from the save unit 204 and waits until the discharge time passes.

When the discharge time passes, the control unit 201 puts the resistance film 10B into the high impedance (HI-Z) state by turning off the switch 31B (step S25B). Then, the detection unit 202 detects a voltage corresponding to the X-coordinate of the touch position (step S26B).

Next, the control unit 201 generates the potential gradient from 0 to Vcc to the resistance film 20B by tuning on the switches 32B, 34B, 36B and 37B and turning off the switches 33B and 35B (step S27B). The control unit 201 grounds the resistance film 10B via the pull-down resistor 6 by turning on the switch 31B (step S28B). The electric charges accumulated between the resistance films 10B and 20B are discharged (step S29B). Here, since the discharge time is set by the setting unit 203 and is saved beforehand in the save unit 204, the control unit 201 reads out the discharge time from the save unit 204 and waits until the discharge time passes.

When the discharge time passes, the control unit 201 puts the resistance film 10B into the high impedance (HI-Z) state by turning off the switch 31B (step S30B). The detection unit 202 detects a voltage corresponding to the Y-coordinate of the touch position (step S31B). Then, the touch detection process of FIG. 21B is performed (step S32B).

The control unit 201 judges whether the touch-on is detected by the touch detection process (step S33B). When it is judged that the touch-on is not detected (NO in step S33B), the control unit 201 judges that the detection of the X-coordinate and the Y-coordinate is failure (step S37B), and the present process is terminated. When it is judged that the touch-on is detected (YES in step S33B), the control unit 201 decrements the value of the counter by 1 (step S34B). The control unit 201 judges whether the value of the counter is 0 (step S35B).

When it is judged that the value of the counter is not 0 (NO in step S35B), the process returns to step S22B. On the other hand, when it is judged that the value of the counter is 0 (YES in step S35B), the control unit 201 performs the above-mentioned judgment process of the erroneous detection of the touch-on (step S36B), and the present process is terminated. Here, since the detection of the X-coordinate and the Y-coordinate is repeatedly performed as illustrated by steps S22B to S31B before the value of the counter becomes 0, the detection unit 202 detects n X-coordinates (n=two or more) and n Y-coordinates (n=two or more).

In the present process, although the detection of the Y-coordinate is performed after the detection of the X-coordinate, the detection of the X-coordinate may be performed after the detection of the Y-coordinate.

Here, the discharge time at the time of the touch detection, the discharge time at the time of the detection of the XY-coordinates, the number of times of the measurement of the X-coordinate and the Y-coordinate, and the divisional number for dividing the number of times of the measurement of the X-coordinate and the Y-coordinate can be changed by the setting unit 203, based on a type, an intended purpose and an usage environment of the touch panel. Thereby, the discharge time at the time of the touch detection, the discharge time at the time of the detection of the XY-coordinates, the number of times of the measurement of the X-coordinate and the Y-coordinate, and the divisional number for dividing the number of times of the measurement of the X-coordinate and the Y-coordinate can be set in consideration of the type, the intended purpose and the usage environment of the touch panel.

According to the present embodiment, before detecting the presence or absence of the touch and the position of the touch, the control unit 201 controls the operation of the switches connected to electrodes on the resistance film (e.g. the resistance film 20A or 10B) of a voltage detection side so as to ground the electrodes on the resistance film of the voltage detection side, and discharges the touch panel. Therefore, the presence or absence of the touch and the position of the touch is not detected before the voltage convergence, and hence malfunction, such as erroneous detection, coordinate deviation of the touch and input impossibility, can be restrained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:
1. A touch panel device comprising:
a first resistance film and a second resistance film each of which includes an electrode;
a switch connected to the electrode;
a controller that controls operation of the switch; and
a detector that, when a voltage is applied to a resistance film of a voltage applied side among the first resistance film and the second resistance film, detects presence or absence of touch and a position of the touch based on a voltage detected from the electrode on a resistance film of a voltage detection side among the first resistance film and the second resistance film;

wherein before detection operation by the detector, the controller controls the operation of the switch connected to the electrode on the resistance film of the voltage detection side so that the electrode on the resistance film of the voltage detection side is grounded concurrent with the voltage being applied to the resistance film of the voltage applied side.

2. The touch panel device as claimed in claim 1, wherein the detector alternately detects an X-coordinate and a Y-coordinate which indicate the position of the touch two or more times, and sets respective averages of the detected X-coordinates and the detected Y-coordinates as the position of the touch.

3. The touch panel device as claimed in claim 2, further comprising:

a setter that sets a number of times of the detection of each of the X-coordinate and the Y-coordinate, and a divisional number for dividing the number of times of the detection of each of the X-coordinate and the Y-coordinate.

4. The touch panel device as claimed in claim 2, wherein the detector judges whether the touch is erroneously detected by comparing a number of X-coordinates and a number of Y-coordinates included in ranges with a given threshold value, the ranges being decided by adding given deviations to the respective averages of the detected X-coordinates and the detected Y-coordinates, and by subtracting the given deviations from respective averages of the detected X-coordinates and the detected Y-coordinates.

5. The touch panel device as claimed in claim 1, wherein the controller controls the operation of the switch connected to the electrode on the resistance film of the voltage applied side so as to apply a given voltage to the resistance film of the voltage applied side before the electrode on the resistance film of the voltage detection side is grounded, and the detector detects the presence or absence of the touch based on the voltage detected from the electrode on the resistance film of the voltage detection side after the electrode on the resistance film of the voltage detection side is grounded.

6. The touch panel device as claimed in claim 1, wherein the controller controls the operation of the switch connected to the electrode on the resistance film of the voltage applied side so as to generate a potential gradient to the resistance film of the voltage applied side before the electrode on the resistance film of the voltage detection side is grounded, and the detector detects the presence or absence of the touch based on the voltage detected from the electrode on the resistance film of the voltage detection side after the electrode on the resistance film of the voltage detection side is grounded.

\* \* \* \* \*